(12) United States Patent
Carroll et al.

(10) Patent No.: US 11,410,506 B2
(45) Date of Patent: *Aug. 9, 2022

(54) PROCESSING SYSTEM FOR PROVIDING ENHANCED REALITY INTERFACES AT AN AUTOMATED TELLER MACHINE (ATM) TERMINAL PLATFORM

(71) Applicant: Bank of America Corporation, Charlotte, NC (US)

(72) Inventors: Matthew E. Carroll, Charlotte, NC (US); Michael Ogrinz, Easton, CT (US); Nathan Dent, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,109

(22) Filed: Dec. 1, 2020

(65) Prior Publication Data
US 2021/0082257 A1    Mar. 18, 2021

Related U.S. Application Data

(63) Continuation of application No. 16/123,455, filed on Sep. 6, 2018, now Pat. No. 10,916,105.

(51) Int. Cl.
*G07F 19/00* (2006.01)
*G06F 21/31* (2013.01)
(Continued)

(52) U.S. Cl.
CPC ............ *G07F 19/206* (2013.01); *G06F 3/016* (2013.01); *G06F 21/31* (2013.01); *H04L 63/08* (2013.01)

(58) Field of Classification Search
CPC ........ G07F 19/206; G06F 3/016; G06F 21/31; H04L 63/08
(Continued)

(56) References Cited

U.S. PATENT DOCUMENTS 4,175,694 A * 11/1979 Donabin ................ G06K 17/00
235/475
6,083,270 A     7/2000 Scott
(Continued)

OTHER PUBLICATIONS

Sep. 30, 2020—(US) Notice of Allowance—U.S. Appl. No. 16/123,455.
(Continued)

*Primary Examiner* — Daniel St Cyr

(74) *Attorney, Agent, or Firm* — Banner & Witcoff, Ltd.

(57) ABSTRACT

Aspects of the disclosure relate to processing systems that implement an enhanced reality device to facilitate transactions at a screen-less automated teller machine (ATM). A computing platform may receive a request to initiate a transaction with a screen-less automated ATM. Based on the request to initiate the transaction, the computing platform may send pre-transaction interface information and commands directing the enhanced reality device to generate a pre-transaction interface. The computing platform may receive an authentication request from the screen-less ATM indicating its availability and requesting authentication information. In response to validating the authentication information, the computing platform may generate transaction interface information. The computing platform may send the transaction interface information to the enhanced reality device. The computing platform may receive a transaction completion indication from the screen-less ATM. After receiving the transaction completion indication, the computing platform may send haptic feedback indicating that the transaction is complete.

20 Claims, 19 Drawing Sheets

(51) Int. Cl.
  *G06F 3/01* (2006.01)
  *H04L 9/40* (2022.01)
(58) Field of Classification Search
  USPC .................................................. 235/379, 380
  See application file for complete search history.

(56) References Cited

U.S. PATENT DOCUMENTS

| | | | |
|---|---|---|---|
| 6,575,361 B1 * | 6/2003 | Graves | G06Q 20/085 |
| | | | 235/379 |
| 6,778,643 B1 * | 8/2004 | Bushey | G06F 8/20 |
| | | | 379/112.06 |
| 6,945,457 B1 | 9/2005 | Barcelou | |
| 7,305,691 B2 | 12/2007 | Cristofalo | |
| 9,547,960 B2 | 1/2017 | Thomas et al. | |
| 9,659,297 B2 | 5/2017 | Russell et al. | |
| 9,671,865 B2 | 6/2017 | Modarres et al. | |
| 9,713,675 B2 | 7/2017 | Levien et al. | |
| 9,733,644 B2 | 8/2017 | Levien et al. | |
| 9,754,418 B2 | 9/2017 | Suto et al. | |
| 9,762,851 B1 | 9/2017 | Baumert et al. | |
| 9,763,628 B2 | 9/2017 | Levesque et al. | |
| 9,779,423 B2 | 10/2017 | Turgeman | |
| 9,792,594 B1 | 10/2017 | Bayha et al. | |
| 9,798,325 B2 | 10/2017 | Levien et al. | |
| 9,805,513 B2 | 10/2017 | Suto et al. | |
| 9,832,338 B2 | 11/2017 | Roberts | |
| 9,833,697 B2 | 12/2017 | Grant et al. | |
| 9,848,009 B2 | 12/2017 | Turgeman et al. | |
| 9,880,256 B2 | 1/2018 | Baxley et al. | |
| 9,880,623 B2 | 1/2018 | Lacroix et al. | |
| 9,898,119 B2 | 2/2018 | Aberg et al. | |
| 9,898,901 B1 | 2/2018 | Kurian et al. | |
| 9,922,345 B2 | 3/2018 | Mikurak | |
| 9,992,429 B2 | 6/2018 | Baumert et al. | |
| 9,992,491 B2 | 6/2018 | Sen et al. | |
| 10,002,189 B2 | 6/2018 | Cheyer | |
| 10,013,705 B2 | 7/2018 | Mikurak | |
| 10,032,345 B2 | 7/2018 | Grant et al. | |
| 10,037,421 B2 | 7/2018 | Turgeman et al. | |
| 10,037,628 B2 | 7/2018 | Suto et al. | |
| 10,043,122 B1 | 8/2018 | Koeppel et al. | |
| 10,049,533 B2 | 8/2018 | Kurian et al. | |
| 10,051,123 B2 | 8/2018 | Griesmer et al. | |
| 10,069,837 B2 | 9/2018 | Turgeman et al. | |
| 10,069,852 B2 | 9/2018 | Turgeman et al. | |
| 10,462,425 B1 | 10/2019 | Carroll et al. | |
| 10,916,105 B2 * | 2/2021 | Carroll | G07F 19/206 |
| 2018/0053394 A1 | 2/2018 | Gersten | |

OTHER PUBLICATIONS

Jul. 17, 2020—(US) Office Action—U.S. Appl. No. 16/123,455.
Jan. 10, 2020—(US) Office Action—U.S. Appl. No. 16/123,455.

* cited by examiner

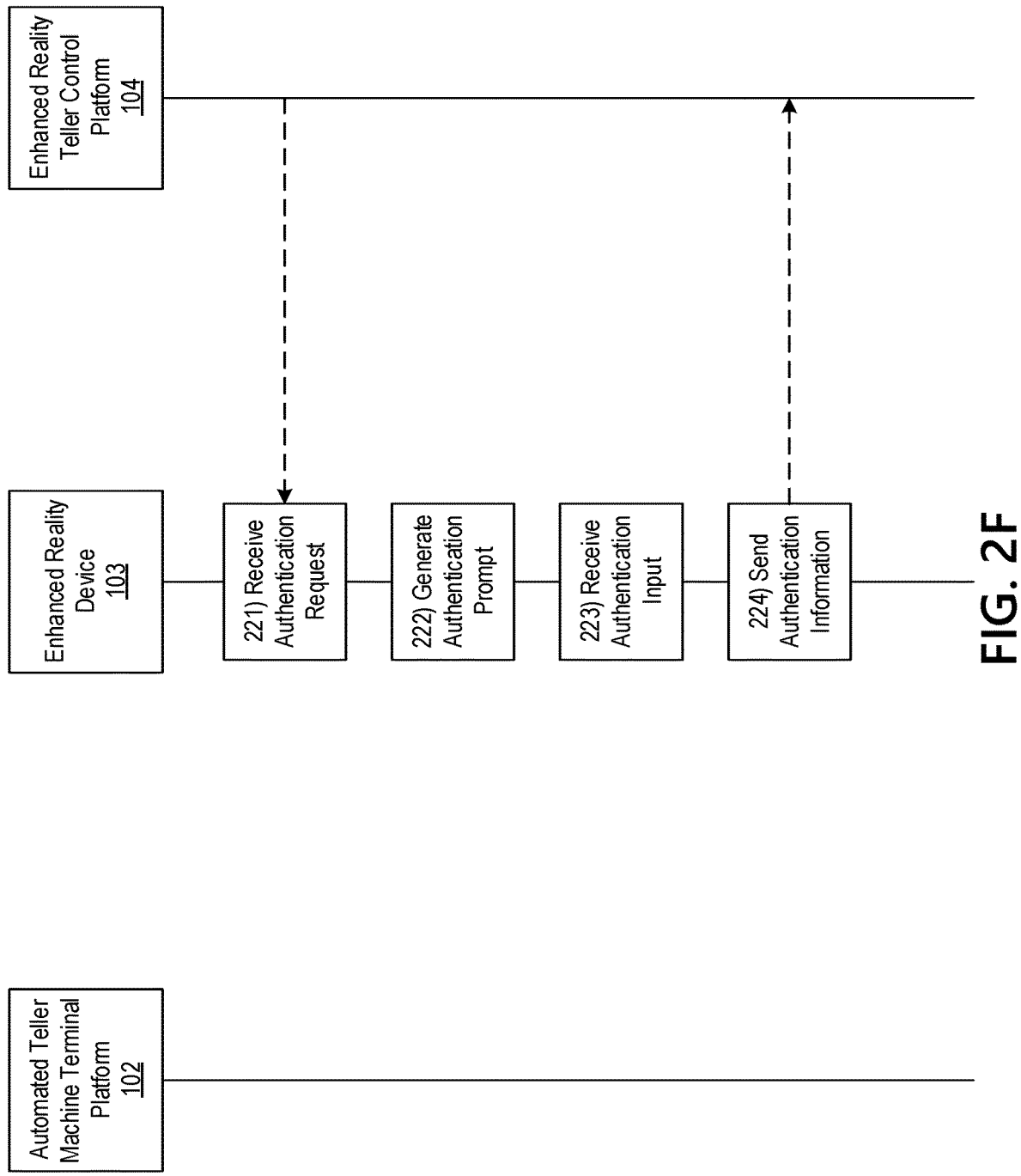

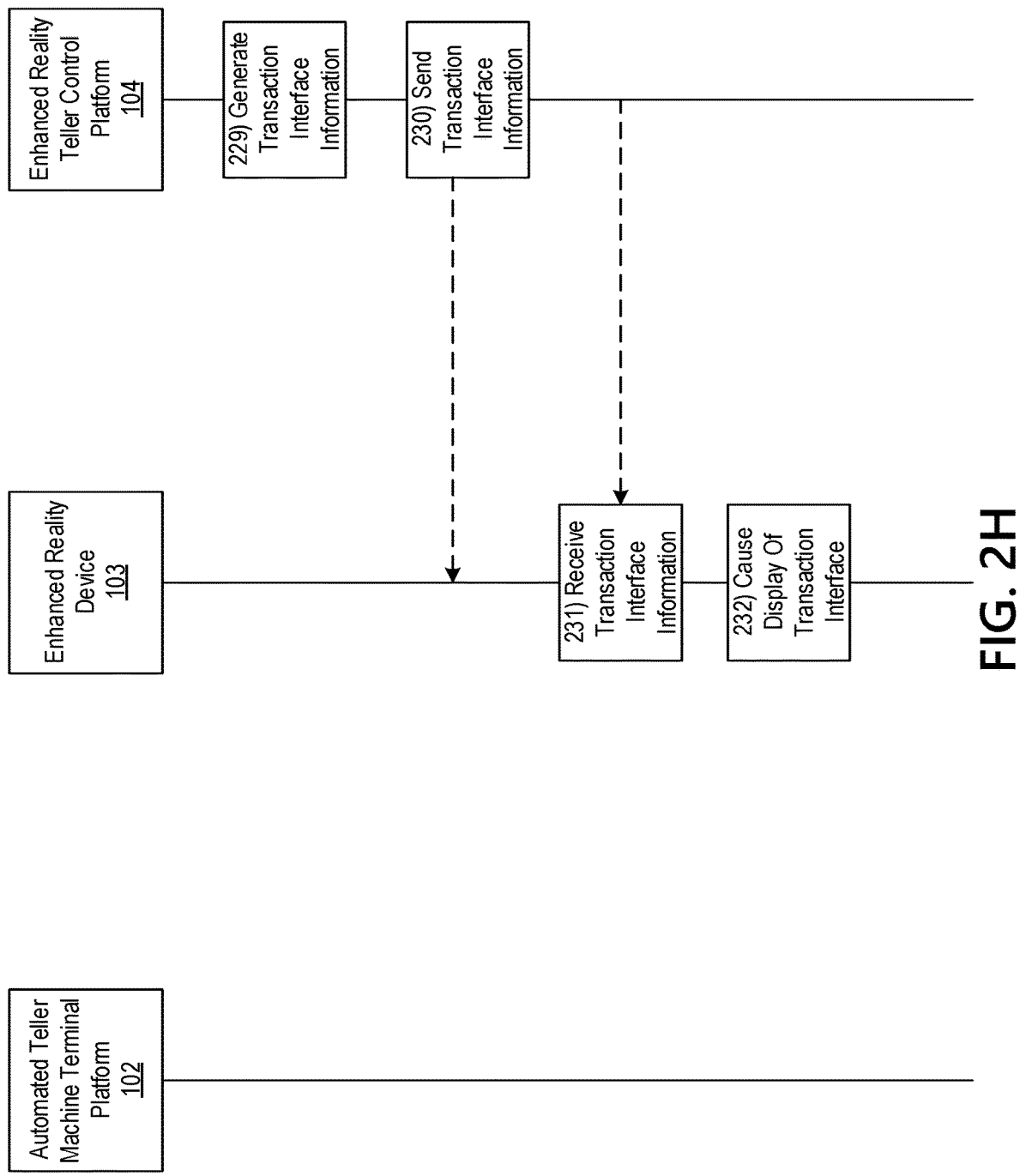

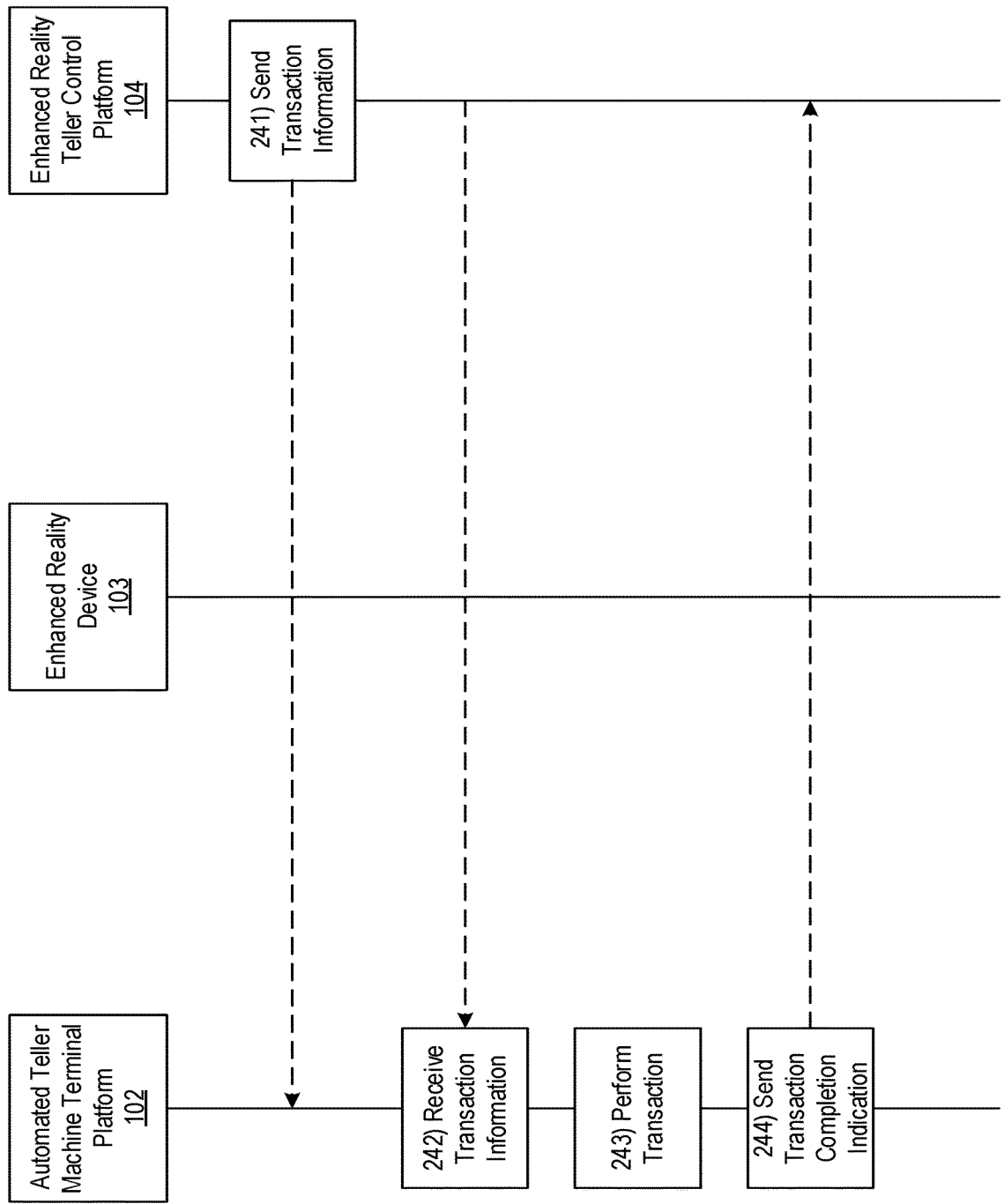

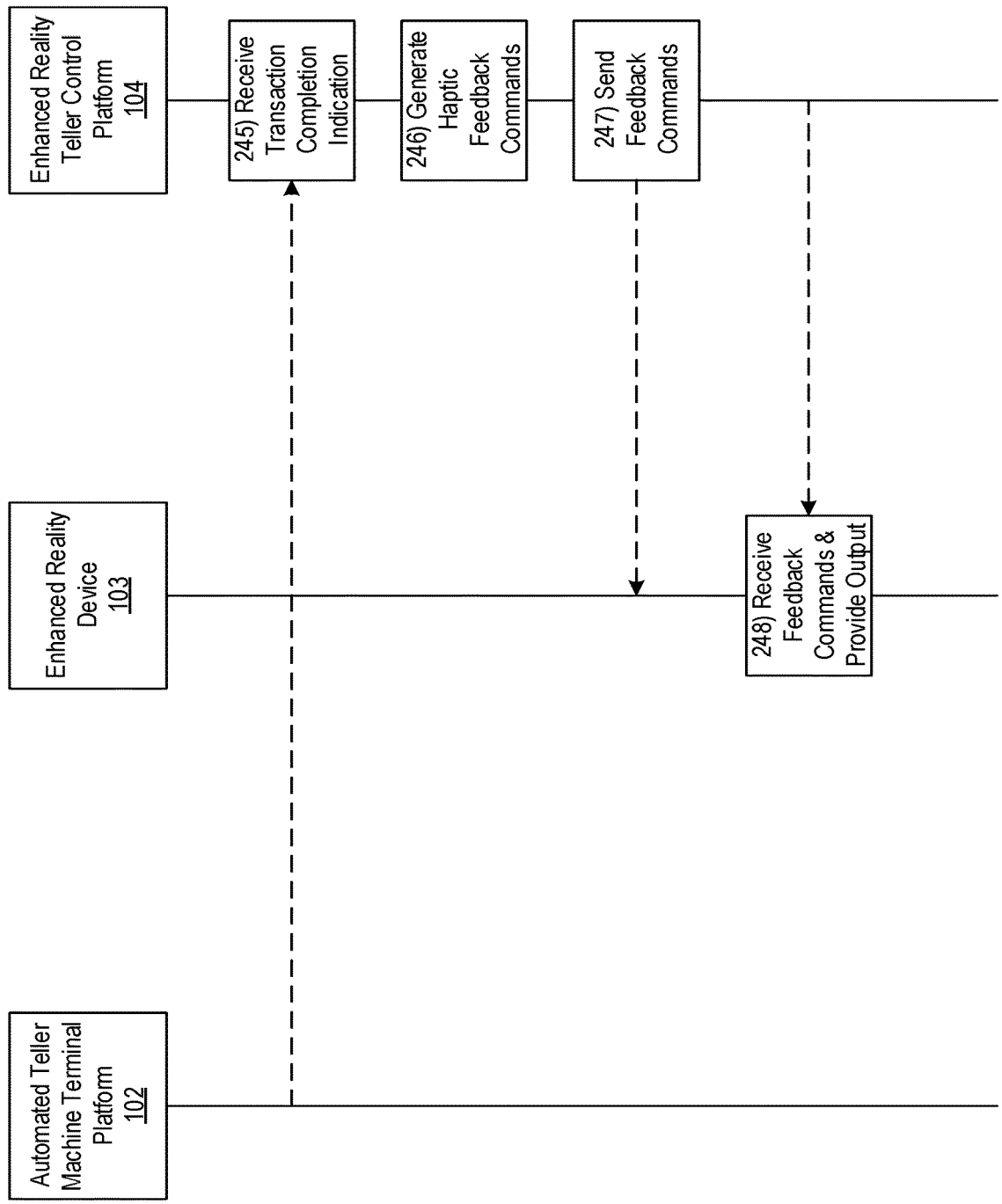

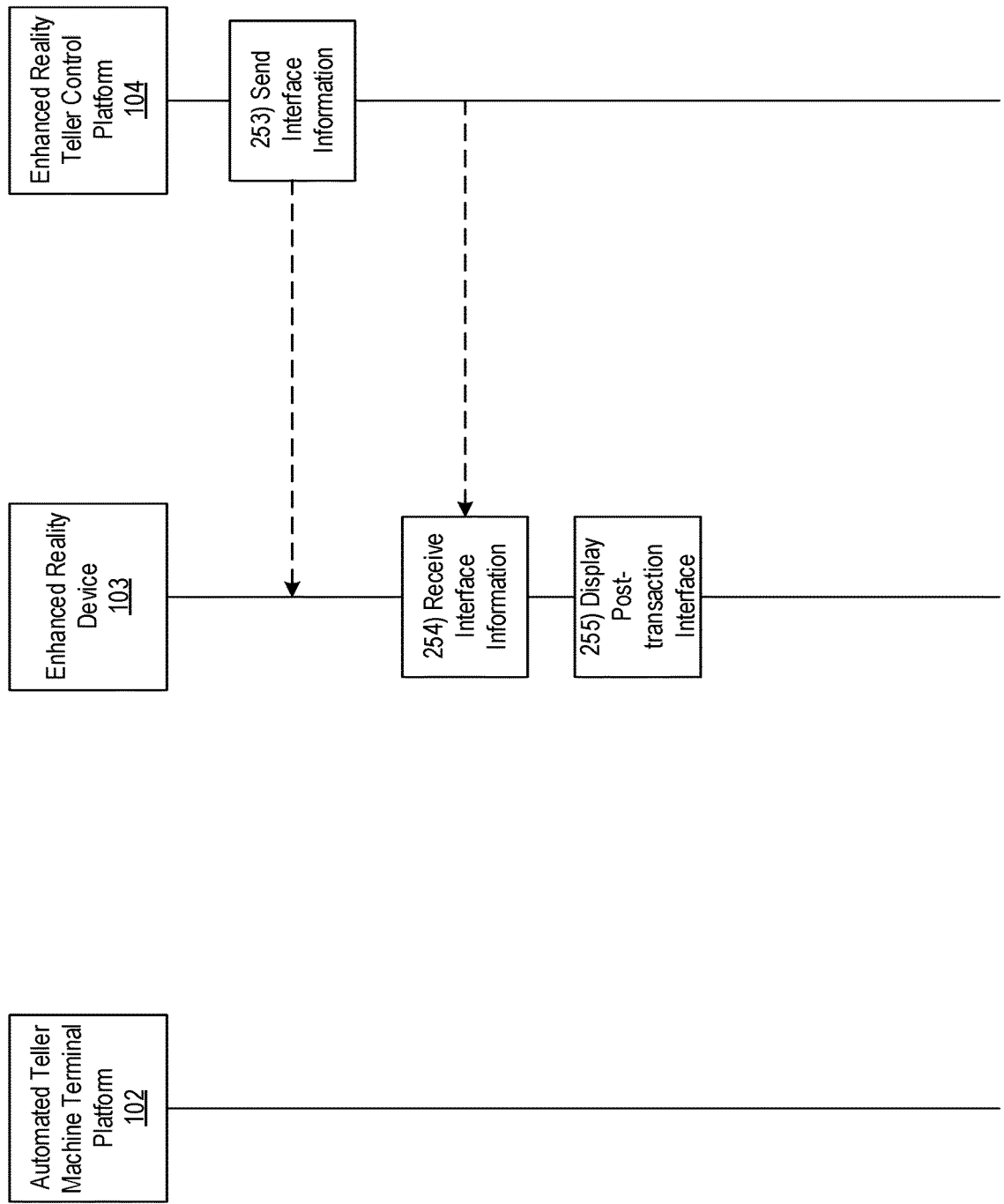

305

Enhanced Reality Authentication Interface

Authentication verified. Please proceed to terminal 5.

405

Enhanced Reality Transaction Interface

Please insert card into highlighted slot.

Enhanced Reality Transaction Interface

Please enter withdrawal amount.

| 1 | 2 | 3 |
|---|---|---|
| 4 | 5 | 6 |
| 7 | 8 | 9 |

$20.00

Enhanced Reality Transaction Interface

Unauthorized personnel within security perimeter (see map). Cash to be dispensed after delay. Please wait.

<u>Legend</u>
Dot = my position
X = unauthorized personnel

PROCESSING SYSTEM FOR PROVIDING ENHANCED REALITY INTERFACES AT AN AUTOMATED TELLER MACHINE (ATM) TERMINAL PLATFORM

CROSS REFERENCE TO RELATED APPLICATION

This application claims priority to and is a Continuation application of U.S. Ser. No. 16/123,455, filed on Sep. 6, 2018 and titled "PROCESSING SYSTEM FOR PROVIDING ENHANCED REALITY INTERFACES AT AN AUTOMATED TELLER MACHINE (ATM) TERMINAL PLATFORM." The related application is incorporated by reference herein in its entirety for all purposes.

BACKGROUND

Aspects of the disclosure relate to processing systems for providing enhanced reality interfaces at a screen-less automated teller machine. In particular, one or more aspects of the disclosure relate to computing platforms that utilize enhanced reality interfaces at a screen-less automated teller machine to reduce network bandwidth consumption, increase processing efficiency, and increase security of automated teller machine transactions.

Many organizations and individuals rely on automated teller machines as a means for conducting transactions and providing account access. In many instances, however, display screens implemented into automated teller machines may be prone to failure and difficult to maintain. In addition, conducting transactions using a screen implemented into automated teller machines may be time consuming, which may result in increased consumption of network resources and processing power, as well as lengthy wait times for other customers. Furthermore, interacting with an automated teller machine on an integrated display screen may pose security risks from nearby individuals who may be able to obtain confidential information or otherwise interfere with a given transaction.

SUMMARY

Aspects of the disclosure provide effective, efficient, scalable, and convenient technical solutions that address and overcome the technical problems associated with receiving input, corresponding to an automated teller transaction, using a display at an automated teller machine. For example, some aspects of the disclosure provide techniques that may enable computing platforms to cause display of enhanced reality interfaces corresponding to an automated teller interface in ways that reduce consumption of network resources and processing power, while improving transaction security.

In accordance with an embodiment of the disclosure, a computing platform comprising at least one processor, a communication interface, and memory storing computer-readable instructions may receive, from an enhanced reality device, a request to initiate a transaction with a screen-less automated teller machine of an automated teller machine terminal platform. Based on the request to initiate the transaction with the screen-less automated teller machine, the computing platform may generate pre-transaction interface information and one or more commands directing the enhanced reality device to generate a pre-transaction enhanced reality interface. The computing platform may send, to the enhanced reality device, the pre-transaction interface information and the one or more commands directing the enhanced reality device to generate the pre-transaction enhanced reality interface. In some instances, the pre-transaction enhanced reality interface may prompt a user for information that is used to initiate the transaction with the screen-less automated teller machine. The computing platform may receive an authentication request from the screen-less automated teller machine indicating that the screen-less automated teller machine is available and requesting authentication information from the enhanced reality device. In response to validating the authentication information from the enhanced reality device and using the information that is used to initiate the transaction with the screen-less automated teller machine, the computing platform may generate enhanced reality transaction interface information. The computing platform may send, to the enhanced reality device, the enhanced reality transaction interface information and one or more commands directing the enhanced reality device to generate an enhanced reality transaction interface corresponding to a display of the screen-less automated teller machine. The computing platform may receive a transaction completion indication from the screen-less automated teller machine indicating that the transaction with the screen-less automated teller machine is complete. After receiving the transaction completion indication from the screen-less automated teller machine indicating that the transaction with the screen-less automated teller machine is complete, the computing platform may generate haptic feedback indicating that the transaction is complete and may send, to the enhanced reality device, the haptic feedback.

In some embodiments, the computing platform may establish, with the enhanced reality device, a first wireless data connection and may establish, with the automated teller machine terminal platform, a second wireless data connection. In some embodiments, the computing platform may receive the information that is used to initiate the transaction with the screen-less automated teller machine, wherein the information corresponds to a type of transaction to be performed and additional information corresponding to the transaction.

In some embodiments, the computing platform may receive a pre-transaction completion indication from the enhanced reality device. In response to receiving the pre-transaction completion indication, the computing platform may generate a screen-less automated teller machine availability request and may send, to the automated teller machine terminal platform, the screen-less automated teller machine availability request.

In some embodiments, the computing platform may send, to the enhanced reality device, the authentication request. In response to the authentication request, the computing platform may receive authentication information and may validate the authentication information. After validating the authentication information, the computing platform may generate an authentication indication and may send, to the screen-less automated teller machine and the enhanced reality device, the authentication indication.

In some embodiments, the computing platform may generate, based on the information that is used to initiate the transaction with the screen-less automated teller machine, the enhanced reality transaction interface information. In some embodiments, the computing platform may receive sensor data from one or more sensors connected to the screen-less automated teller machine. Based on the sensor data, the computing platform may generate a transaction notification and one or more commands directing the enhanced reality device to cause display of the transaction notification. The computing platform may send, to the enhanced reality device, the transaction notification and the one or more commands directing the enhanced reality device to cause display of the transaction notification.

In some embodiments, the computing platform may receive a transaction completion indication. In response to receiving the transaction completion indication, the computing platform may generate one or more commands directing the enhanced reality device to provide a haptic feedback output indicating that the transaction is complete.

In some embodiments, the computing platform may receive post-transaction information. Based on the post-transaction information, the computing platform may generate post-transaction interface information and may send, to the enhanced reality device, the post-transaction interface information. In some instances, sending the post-transaction interface information may cause the enhanced reality device to generate one or more post-transaction enhanced reality interfaces using the post-transaction interface information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to a screen-less automated teller machine (ATM) that leverages augmented reality (AR) technology to provide AR-based interfaces to a user interacting with the ATM. In an example use case, a user may walk up to an AR-enabled ATM and be recognized by the ATM based on biometrics, Bluetooth/NFC signals from their mobile/AR device, or the like. The AR device and ATM may establish a communications link (e.g., via a backend server) and the AR device may present AR interfaces that enable the user to interact with the ATM (e.g., by providing AR/virtual overlays on physical pieces of the ATM). The ATM itself might not have a display screen—and instead may only have a biometric reader, dispensing device, and the like—such that all of the interaction is done on the user's personal AR device. In some instances, the user may be authenticated based on location-based detection (e.g., proximity) and/or biometric-based recognition (e.g., facial scan, retina, fingerprint, and the like). In some instances, the ATM itself might not include biometric sensors—instead the biometric recognition/authentication may be performed on the customer's registered mobile device (which may communicate with the backend server and/or the ATM to indicate if/when the customer is authenticated).

Figure 1A:
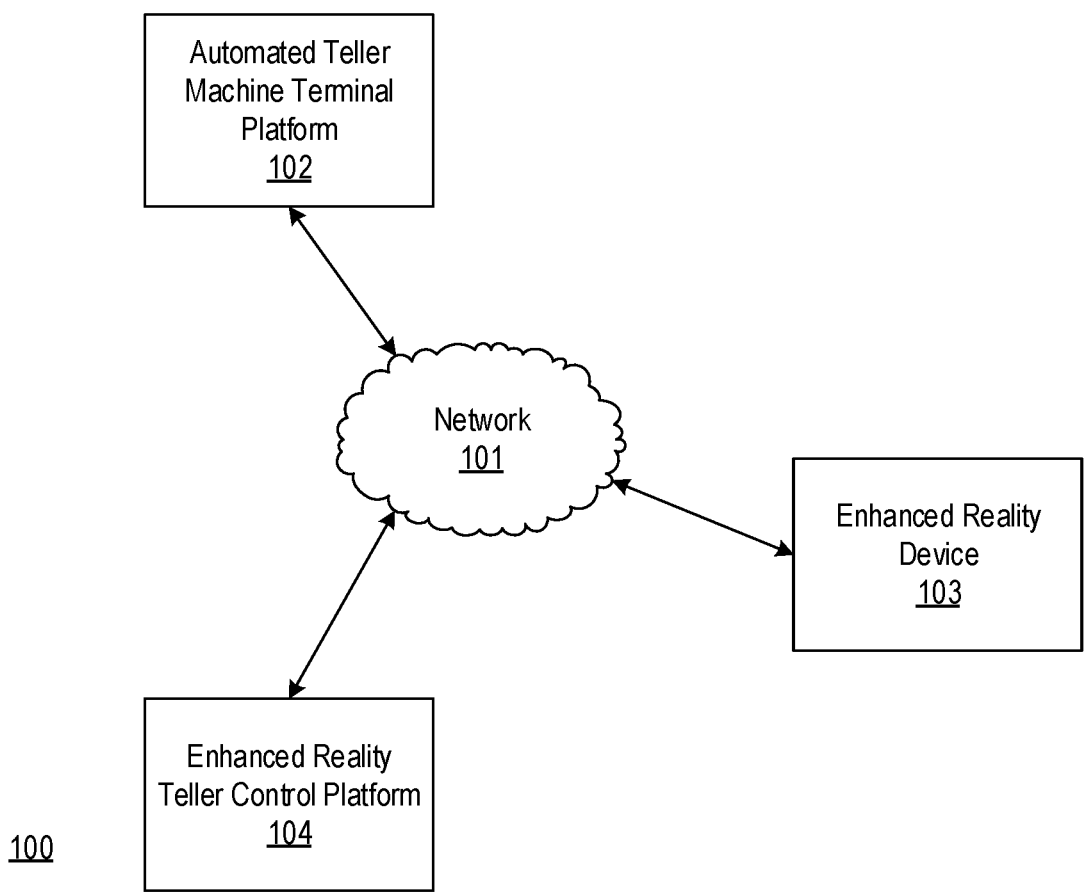
FIGS. 1A and 1B depict an illustrative computing environment for deploying a processing system that controls enhanced reality interfaces corresponding to a screen-less automated teller machine in accordance with one or more example embodiments.
Figure 1B:
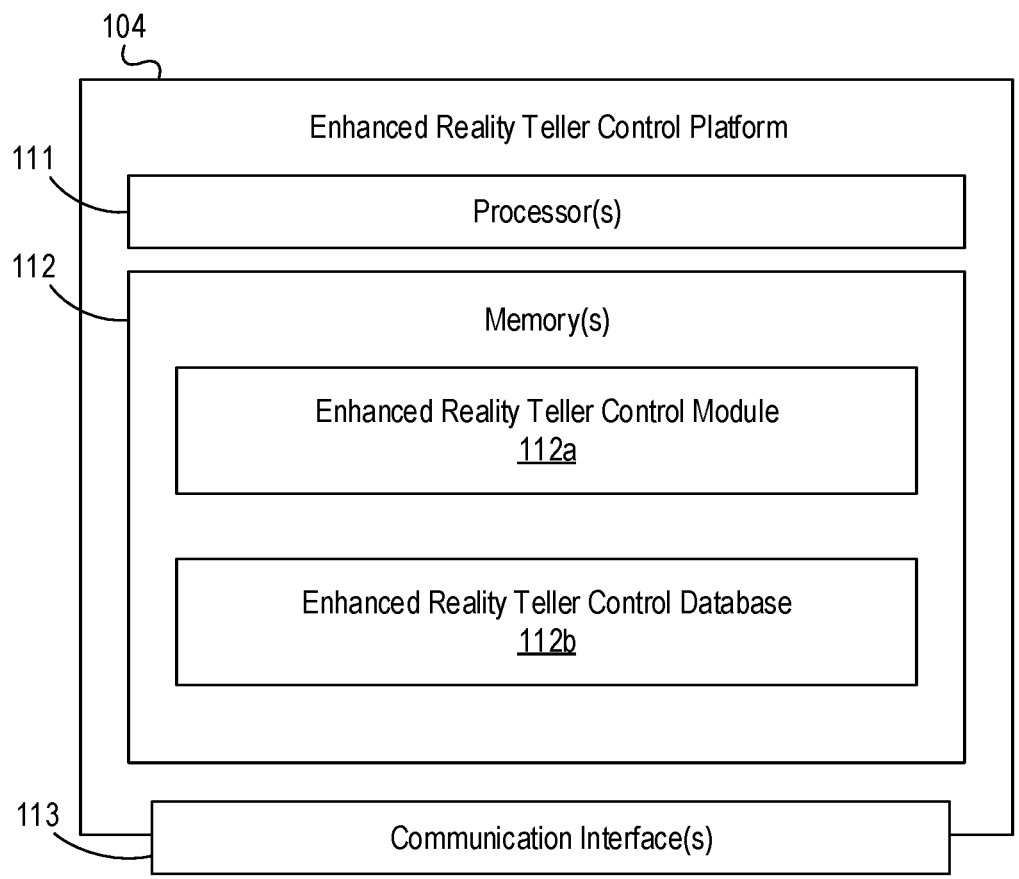

FIGS. 1A-1B depict an illustrative computing environment for deploying a processing system for providing enhanced reality interfaces at a screen-less automated teller machine in accordance with one or more example embodiments. Referring to FIG. 1A, computing environment 100 may include one or more computer systems. For example, computing environment 100 may include an automated teller machine terminal platform 102, an enhanced reality device 103, and an enhanced reality teller control platform 104.

Automated teller machine terminal platform 102 may be a computer system that includes one or more computing devices and/or other computer components (e.g., processors, memories, communication interfaces). In addition, automated teller machine terminal platform 102 may be configured to receive requests (e.g., requests to process a withdrawal, process a deposit, transfer funds, and the like). In some instances, the automated teller machine terminal platform 102 may be configured to only interact with an enhanced reality device, such as the enhanced reality device 103. Additionally or alternatively, the automated teller machine terminal platform 102 might not comprise a display. Additionally or alternatively, the automated teller machine terminal platform 102 might not resemble a standard automated teller machine, but rather may only include slots for inputting and outputting various items (debit cards, cash, and the like). Additionally or alternatively, the automated teller machine terminal platform 102 might not be visually recognizable as an automated teller machine, but rather it may include functional components and/or decorative components that are configured to blend into the local environment and/or deployment location of the automated teller machine terminal platform 102. Thus, it may be difficult to determine that a user is actually performing a transaction at the automated teller machine terminal platform 102. Additionally or alternatively, the automated teller machine terminal platform 102 may include a biometric scanner than may be used for user authentication. In some instances, the automated teller machine terminal platform 102 may comprise a single screen-less automated teller machine. In other instances, the automated teller machine terminal platform 102 may comprise multiple screen-less automated teller machines (e.g., the automated teller machine terminal platform 102 may be a six-sided screen-less automated teller machine). In these instances, the automated teller machine terminal platform 102 may be configured to determine availability of the various screen-less automated teller machines, and may generate an authentication request to validate interactions between the available screen-less automated teller machine and an enhanced reality device.

Enhanced reality device 103 may include one or more computing devices and/or other computer components (e.g., processors, memories, communication interfaces). In addition, and as illustrated in greater detail below, enhanced reality device 103 may cause display of and/or otherwise present one or more graphical user interfaces. In some instances, the enhanced reality device 103 may be an augmented reality device, virtual reality device, or the like. In some instances, the graphical user interfaces presented by enhanced reality device 103 may provide access to an automated teller experience, such as an enhanced reality automated teller experience provided by a financial institution. Such graphical user interfaces, for instance, may provide access to financial accounts that may be modified using withdrawals, deposits, transfers, and the like. In some instances, providing the graphical user interfaces at the enhanced reality device 103 may prompt a user to proceed to a particular screen-less automated teller machine, insert a debit card into a particular slot, enter a particular amount for withdrawal, and the like. Additionally or alternatively, the enhanced reality device 103 may also cause display of one or more security notifications (e.g., unauthorized personnel are within a predetermined security perimeter corresponding to the screen-less automated teller machine). In some examples, the graphical user interfaces may provide customers of the financial institution with menus, controls, and/or other options to execute various resolution actions (e.g., withdraw, deposit, transfer, or the like).

As illustrated in greater detail below, enhanced reality teller control platform 104 may be configured to generate, host, transmit, and/or otherwise provide one or more graphical user interfaces (which may, e.g., cause one or more other computer systems to display and/or otherwise present one or more other graphical user interfaces). In some instances, the other graphical user interfaces generated by enhanced reality teller control platform 104 may provide access to a financial account for performing one or more transactions. In some instances, the enhanced reality teller control platform may be configured to facilitate transactions at the screen-less automated teller machine using various interfaces displayed at the enhanced reality device.

Computing environment 100 also may include one or more networks, which may interconnect automated teller machine terminal platform 102, enhanced reality device 103, and enhanced reality teller control platform 104. For example, computing environment 100 may include a network 101 (which may interconnect, e.g., automated teller machine terminal platform 102, enhanced reality device 103, enhanced reality teller control platform 104).

In one or more arrangements, automated teller machine terminal platform 102, enhanced reality device 103, enhanced reality teller control platform 104, and/or the other systems included in computing environment 100 may be any type of computing device capable of receiving a user interface, receiving input via the user interface, and communicating the received input to one or more other computing devices. For example, automated teller machine terminal platform 102, enhanced reality device 103, enhanced reality teller control platform 104, and/or the other systems included in computing environment 100 may, in some instances, be and/or include server computers, desktop computers, laptop computers, tablet computers, smart phones, virtual reality devices, augmented reality devices, or the like that may include one or more processors, memories, communication interfaces, storage devices, and/or other components. As noted above, and as illustrated in greater detail below, any and/or all of automated teller machine terminal platform 102, enhanced reality device 103, and enhanced reality teller control platform 104 may, in some instances, be special-purpose computing devices configured to perform specific functions.

Referring to FIG. 1B, enhanced reality teller control platform 104 may include one or more processors 111, memory 112, and communication interface 113. A data bus may interconnect processor 111, memory 112, and communication interface 113. Communication interface 113 may be a network interface configured to support communication between enhanced reality teller control platform 104 and one or more networks (e.g., network 101, or the like). Memory 112 may include one or more program modules having instructions that when executed by processor 111 cause enhanced reality teller control platform 104 to perform one or more functions described herein and/or one or more databases that may store and/or otherwise maintain information which may be used by such program modules and/or processor 111. In some instances, the one or more program modules and/or databases may be stored by and/or maintained in different memory units of enhanced reality teller control platform 104 and/or by different computing devices that may form and/or otherwise make up enhanced reality teller control platform 104. For example, memory 112 may have, host, store, and/or include an enhanced reality teller control module 112*a* and an enhanced reality teller control database 112*b*. Enhanced reality teller control module 112*a* may have instructions that direct and/or cause enhanced reality teller control platform 104 to execute advance enhanced reality teller control techniques, as discussed in greater detail below. Enhanced reality teller control database 112*b* may store information used by enhanced reality teller control module 112*a* and/or enhanced reality teller control platform 104 in enhanced reality teller control and/or in performing other functions.

Figure 2A:
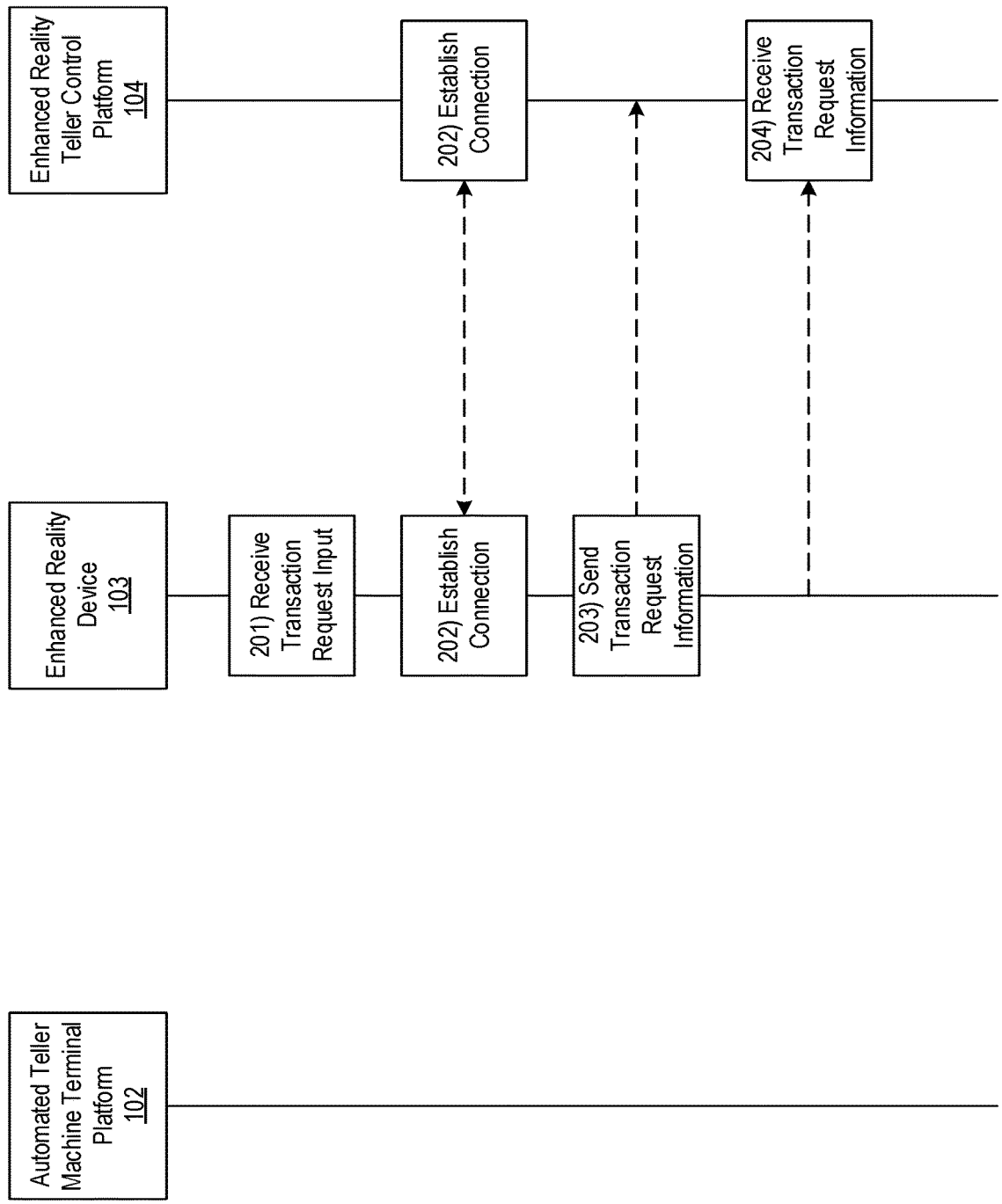
FIGS. 2A-2N depict an illustrative event sequence for deploying a processing system that controls enhanced reality interfaces corresponding to a screen-less automated teller machine in accordance with one or more example embodiments.

FIGS. 2A-2N depict an illustrative event sequence for deploying a processing system that controls enhanced reality interfaces corresponding to a screen-less automated teller machine in accordance with one or more example embodiments. Referring to FIG. 2A, at step 201, enhanced reality device 103 may receive a transaction request input corresponding to a request to conduct a transaction at a screen-less automated teller machine. In some instances, in receiving the transaction request input, the enhanced reality device 103 may receive a hand gesture, a voice command, a head gesture, an eye movement, and the like.

At step 202, the enhanced reality device 103 may establish a connection with an enhanced reality teller control platform, such as enhanced reality teller control platform 104. In some instances, enhanced reality device 103 may establish a first wireless connection with enhanced reality teller control platform 104 to link the enhanced reality device 103 to the enhanced reality teller control platform 104.

At step 203, the enhanced reality device 103 may send transaction request information to the enhanced reality teller control platform 104. In some instances, the enhanced reality device may send the transaction request information to the enhanced reality teller control platform 104 while the first wireless data connection is established. In sending the transaction request information to the enhanced reality teller control platform 104, the enhanced reality device 103 may send information indicating that a user of the enhanced reality device 103 requested a transaction to be performed.

At step 204, the enhanced reality teller control platform 104 may receive the transaction request information sent at step 203. In some instances, the enhanced reality teller control platform 104 may receive the transaction request information via the communication interface 113 while the first wireless data connection is established.

Figure 2B:
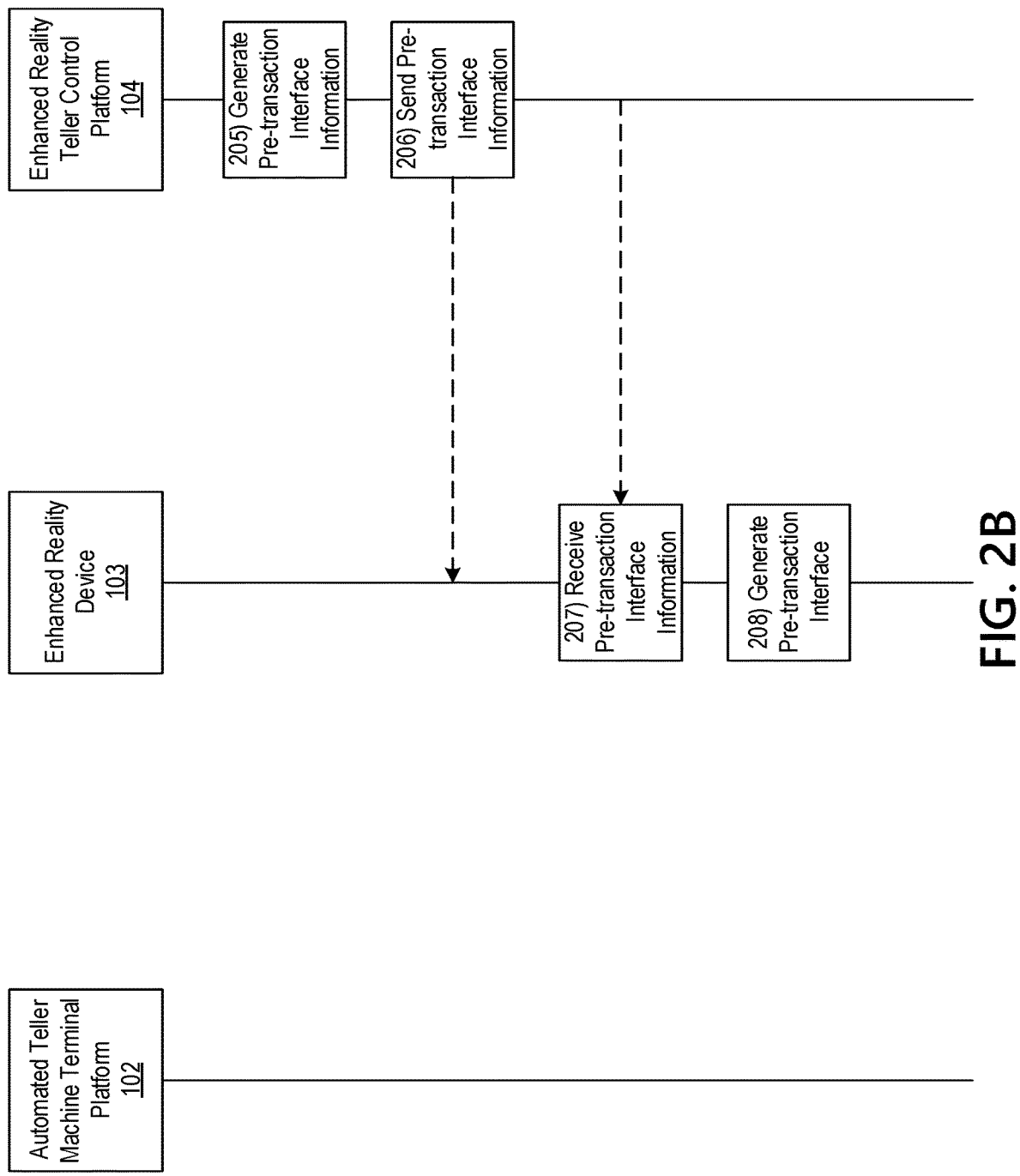

Referring to FIG. 2B, at step 205, the enhanced reality teller control platform 104 may generate pre-transaction interface information and one or more commands directing the enhanced reality device 103 to generate a pre-transaction enhanced reality interface using the pre-transaction interface information. In some instances, the pre-transaction interface information may allow a user to pre-stage a transaction, such as an automated teller transaction, using the enhanced reality device 103.

At step 206, the enhanced reality teller control platform 104 may send the pre-transaction interface information and the one or more commands directing the enhanced reality device 103 to generate the pre-transaction enhanced reality interface to the enhanced reality device 103. In some instances, the enhanced reality teller control platform 104 may send, via the communication interface 113 and while the first wireless data connection is established, the pre-transaction interface information and the one or more commands directing the enhanced reality device 103 to generate the pre-transaction enhanced reality interface to the enhanced reality device 103.

At step 207, the enhanced reality device 103 may receive the pre-transaction interface information and the one or more commands directing the enhanced reality device 103 to generate the pre-transaction enhanced reality interface sent at step 206. In some instances, the enhanced reality device 103 may receive the pre-transaction interface information and the one or more commands directing the enhanced reality device 103 to generate the pre-transaction enhanced reality interface while the first wireless data connection is established.

At step 208, the enhanced reality device 103 may generate a pre-transaction interface using the pre-transaction interface information. In some instances, in generating the pre-transaction interface, the enhanced reality device 103 may cause display of an interface that prompts for pre-transaction input via a user interface of the enhanced reality device 103. In these instances, the enhanced reality device 103 may prompt for a type of transaction, additional transaction information, account information, and the like that may be used to pre-stage the transaction before the user arrives at the automated teller machine terminal platform 102. In some instances, in generating the pre-transaction interface, the enhanced reality device 103 may generate textual prompts and indications in a particular language preset by the user. In these instances, the enhanced reality device 103 may determine the language based on the pre-transaction interface information received at step 207. In some instances, in determining the language, the enhanced reality device 103 may also determine font preferences.

Figure 2C:
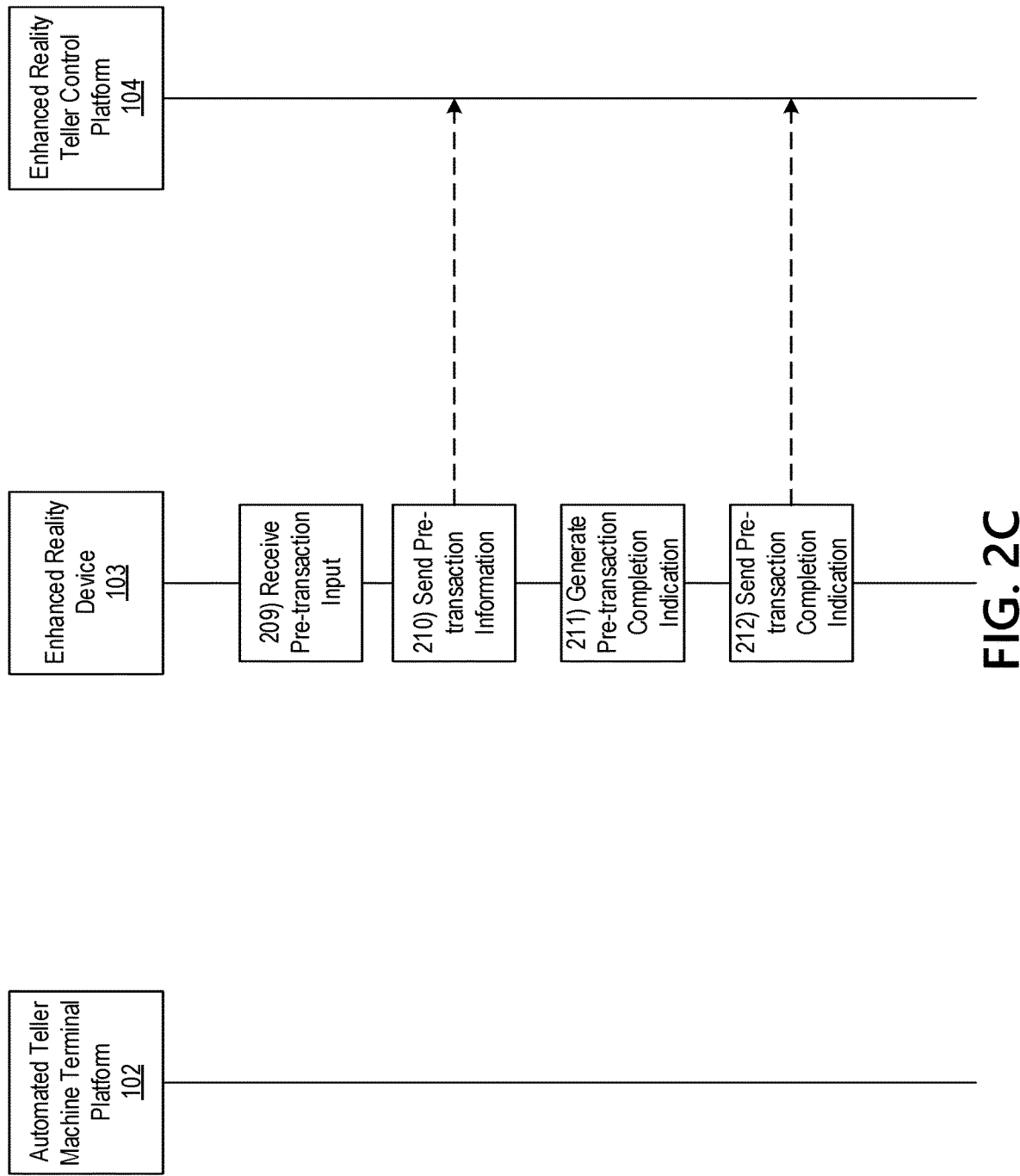

Referring to FIG. 2C, at step 209, enhanced reality device 103 may receive the pre-transaction input prompted for at step 208. In some instances, the enhanced reality device 103 may receive the pre-transaction input via a user interface of the enhanced reality device 103, such as a display of a mobile phone. Additionally or alternatively, the enhanced reality device 103 may receive the pre-transaction input by monitoring a gesture, such as a hand gesture, a head turn, or the like. Additionally or alternatively, the enhanced reality device 103 may receive the pre-transaction input by monitoring eye movements of a user who is wearing a virtual reality headset, augmented reality glasses, and the like.

At step 210, the enhanced reality device 103 may send pre-transaction input information, based on the pre-transaction input received at step 209, to the enhanced reality teller control platform 104. In some instances, the enhanced reality device 103 may send the pre-transaction information to the enhanced reality teller control platform 104 while the first wireless data connection is established. In some instances, the enhanced reality teller control platform 104 may receive the pre-transaction input information via the communication interface 113 and while the first wireless data connection is established.

At step 211, the enhanced reality device 103 may generate a pre-transaction completion indication after sending the pre-transaction information. In some instances, the enhanced reality device 103 may determine whether an additional pre-transaction input may be received. If additional pre-transaction input is not to be received, the enhanced reality device 103 may proceed to step 212. If an additional pre-transaction input is to be received, the enhanced reality device 103 may return to step 209 to receive the additional pre-transaction input. In these instances, the enhanced reality device 103 may prompt for an additional pre-transaction input, and may proceed to step 211 if the additional pre-transaction input is not received within a predetermined period of time. In generating the pre-transaction completion indication, the enhanced reality device 103 may generate an indication indicating that the pre-transaction information corresponding to the pre-transaction input has been sent to the enhanced reality teller control platform 104, and that the enhanced reality device 103 is prepared to facilitate a transaction, based on the pre-transaction information, between a user and a screen-less automated teller machine of the automated teller machine terminal platform 102.

At step 212, the enhanced reality device 103 may send the pre-transaction completion indication to the enhanced reality teller control platform 104. In some instances, the enhanced reality device 103 may send the pre-transaction completion indication to the enhanced reality teller control platform 104 while the first wireless data connection is established.

Figure 2D:
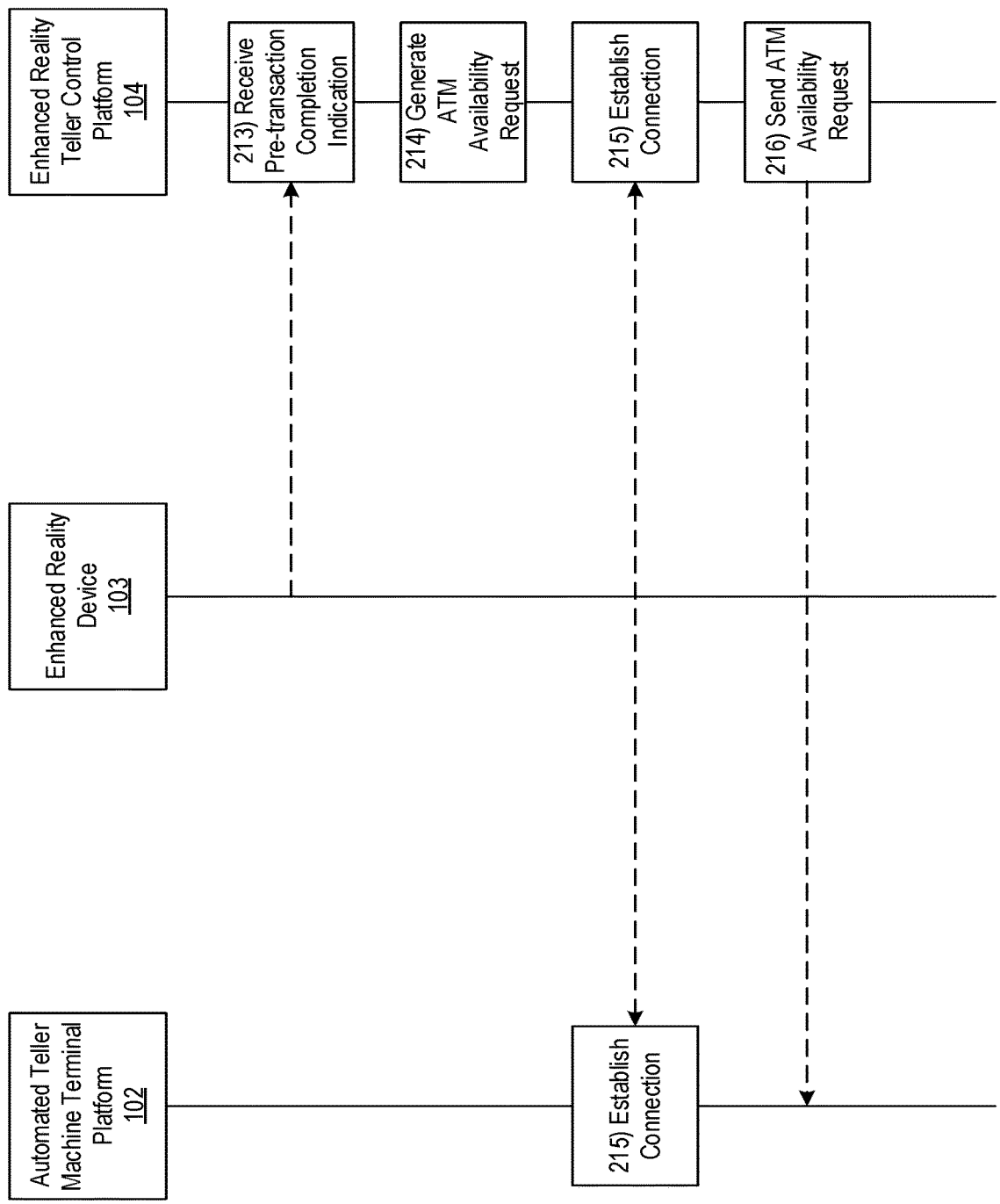

Referring to FIG. 2D, at step 213, the enhanced reality teller control platform 104 may receive the pre-transaction completion indication sent at step 212. In some instances, the enhanced reality teller control platform 104 may receive the pre-transaction completion indication via the communication interface 113 and while the first wireless data connection is established.

At step 214, the enhanced reality teller control platform 104 may generate an automated teller machine availability request. In some instances, in generating the automated teller machine availability request, the enhanced reality teller control platform 104 may generate a request for the automated teller machine terminal platform 102 to determine availability of one or more screen-less automated teller machines at the automated teller machine terminal platform 102, and to provide an indication of an available screen-less automated teller machine.

At step 215, the enhanced reality teller control platform 104 may establish a connection with automated teller machine terminal platform 102. In some instances, the enhanced reality teller control platform 104 may establish a second wireless data connection with the automated teller machine terminal platform 102 to link the automated teller machine terminal platform 102 to the enhanced reality teller control platform 104.

At step 216, the enhanced reality teller control platform 104 may send the automated teller machine availability request, generated at step 214, to the automated teller machine terminal platform 102. In some instances, in sending the automated teller machine availability request, the enhanced reality teller control platform 104 may send, via the communication interface 113 and while the second wireless data connection is established, the automated teller machine availability request. The automated teller machine terminal platform 102 may receive the automated teller machine availability request. In some instances, the automated teller machine terminal platform 102 may receive the automated teller machine availability request while the second wireless data connection is established.

Figure 2E:
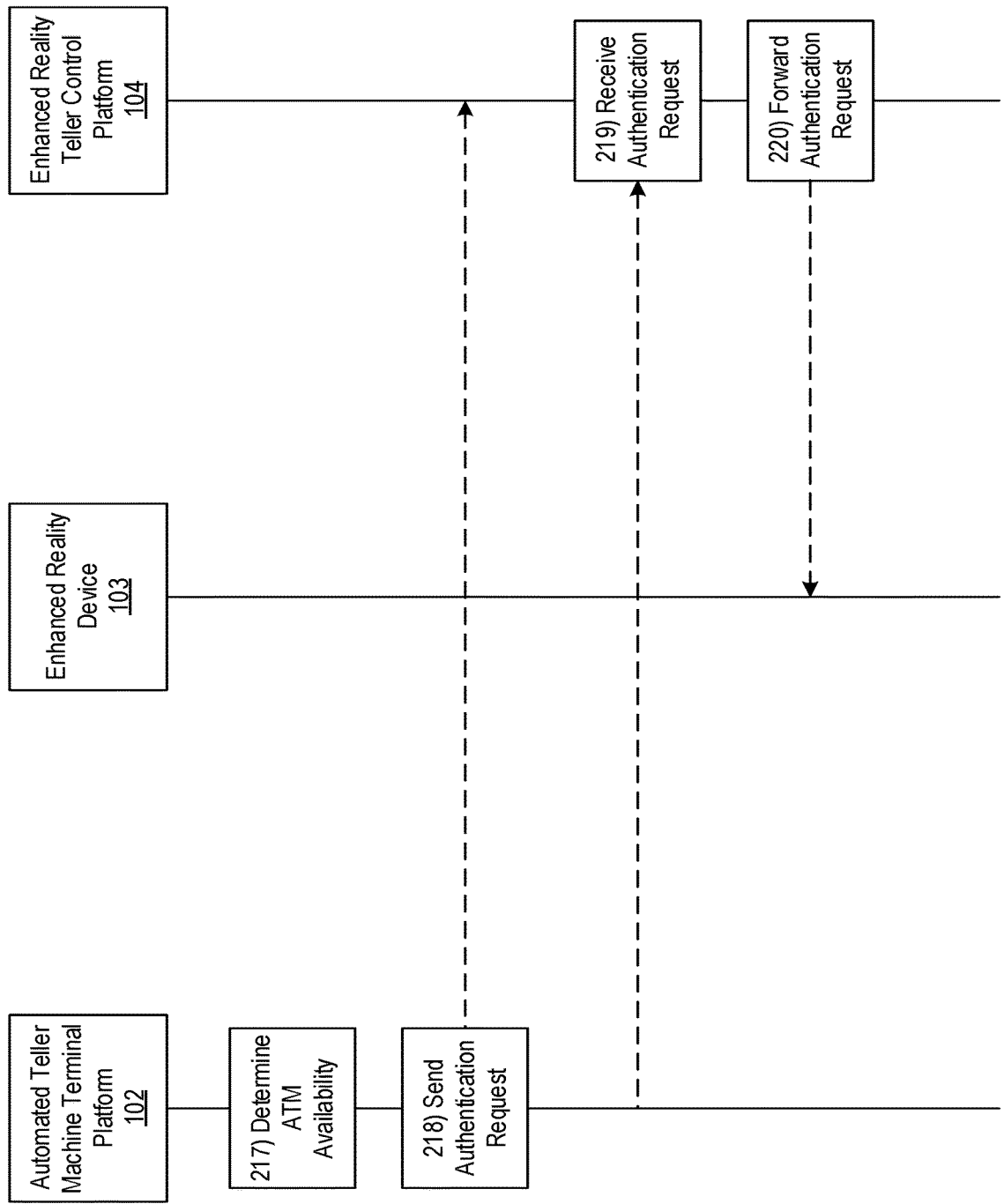

Referring to FIG. 2E, at step 217, the automated teller machine terminal platform 102 may determine availability of one or more screen-less automated teller machines at the automated teller machine terminal platform 102. In some instances, the automated teller machine terminal platform 102 may determine that an estimated wait time for a particular screen-less automated teller machine is less than an estimated wait time for the other screen-less automated teller machines. Additionally or alternatively, the automated teller machine terminal platform 102 may determine that a particular screen-less automated teller machine is not being used. In some instances, the automated teller machine terminal platform 102 may determine availability for a subset of the screen-less automated teller machines that are capable of performing the type of transaction indicated in the pre-transaction input information In another instance, the automated teller machine terminal platform 102 may determine availability for all screen-less automated teller machines of the automated teller machine terminal platform. Additionally or alternatively, the automated teller machine terminal platform 102 may determine that a particular screen-less automated teller machine is available for transactions with an average transaction time that is less than a predetermined threshold (e.g., express transactions).

At step 218, the automated teller machine terminal platform 102 may send an indication of the automated teller machine availability, indicating an available or soon to be available screen-less automated teller machine of the automated teller machine terminal platform 102. Additionally or alternatively, the automated teller machine terminal platform 102 may send an authentication request prompting a user for authentication credentials. In some instances, the automated teller machine terminal platform 102 may send, while the second wireless data connection is established, the indication of the automated teller machine availability and the authentication request.

At step 219, the enhanced reality teller control platform 104 may receive the indication of the automated teller machine availability and the authentication request sent at step 218. In some instances, the enhanced reality teller control platform 104 may receive the indication of the automated teller machine availability via the communication interface 113 and while the second wireless data connection is established.

At step 220, the enhanced reality teller control platform 104 may forward the authentication request, received at step 219, to the enhanced reality device 103. In some instances, the enhanced reality teller control platform 104 may send, via the communication interface 113 and while the first wireless data connection is established, the authentication request.

Referring to FIG. 2F, at step 221, the enhanced reality device 103 may receive the authentication request sent at step 220. In some instances, the enhanced reality device 103 may receive the authentication request from the enhanced reality teller control platform 104 while the first wireless data connection is established.

At step 222, the enhanced reality device 103 may generate an authentication prompt in response to receiving the authentication request. In some instances, the enhanced reality device 103 may generate and cause display of an enhanced reality user interface prompting the user to provide authentication credentials such as a personal identification number (PIN), log in information, and the like.

At step 223, the enhanced reality device 103 may receive an authentication input in response to the authentication prompt generated at step 222. In some instances, the enhanced reality device 103 may receive a voice command, a gesture input, a touch screen input, eye movements, biometric recognition, fingerprint authentication, and the like indicating the authentication information. In some instances, authentication information may be received at the automated teller machine terminal platform 102 using location-based detection (e.g., proximity) and/or biometric-based recognition (e.g., facial scan, retina, fingerprint, and the like.) In these instances, rather than sending the authentication information from the enhanced reality device 103 to the enhanced reality teller control platform 104, the automated teller machine terminal platform 102 may send the authentication information to the enhanced reality teller control platform 104.

At step 224, the enhanced reality device 103 may send authentication information, based on the authentication input received at step 223, to the enhanced reality teller control platform 104. In some instances, the enhanced reality device 103 may send the authentication information to the enhanced reality teller control platform 104 while the first wireless data connection is established.

Figure 2G:
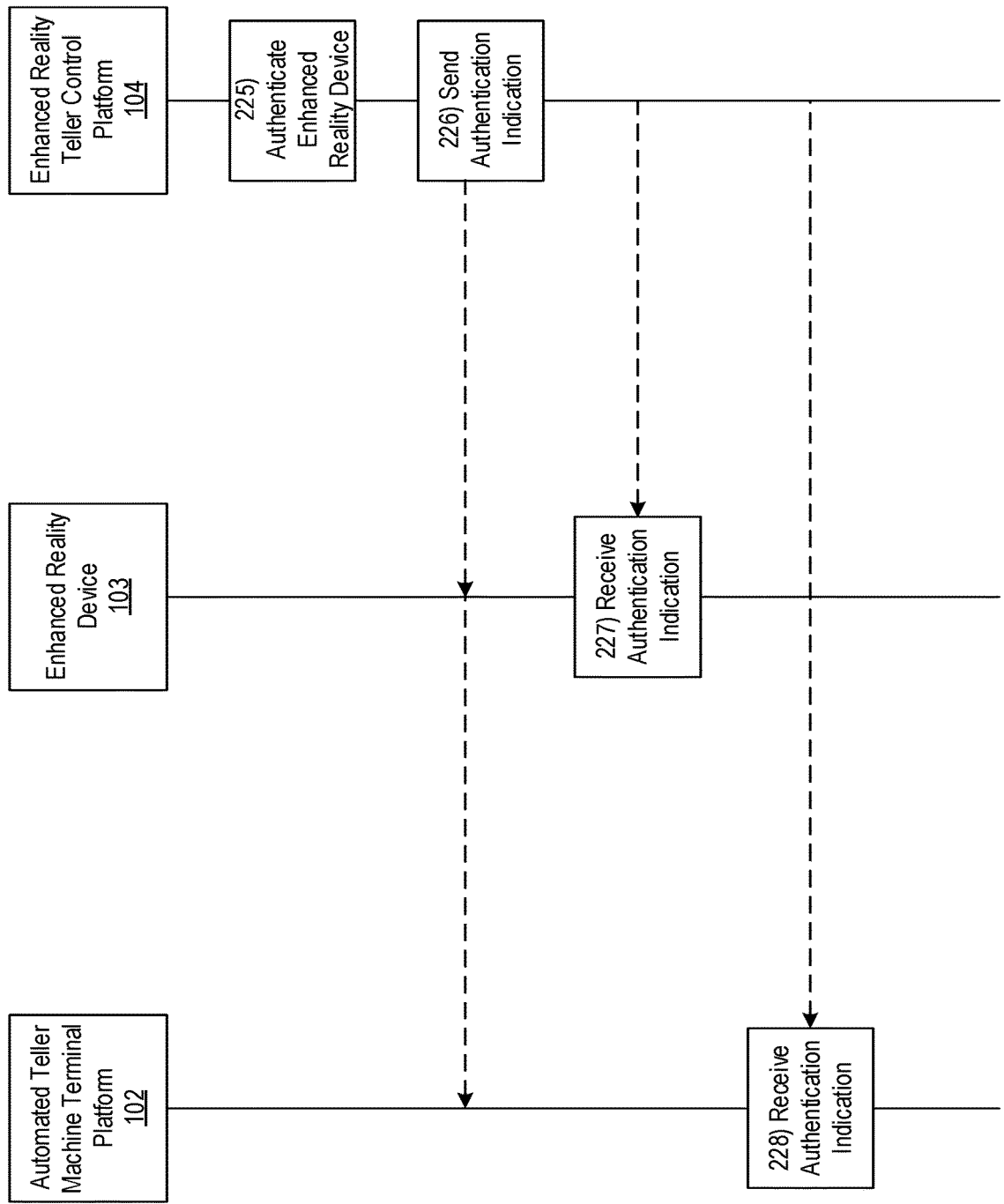
Figure 21:
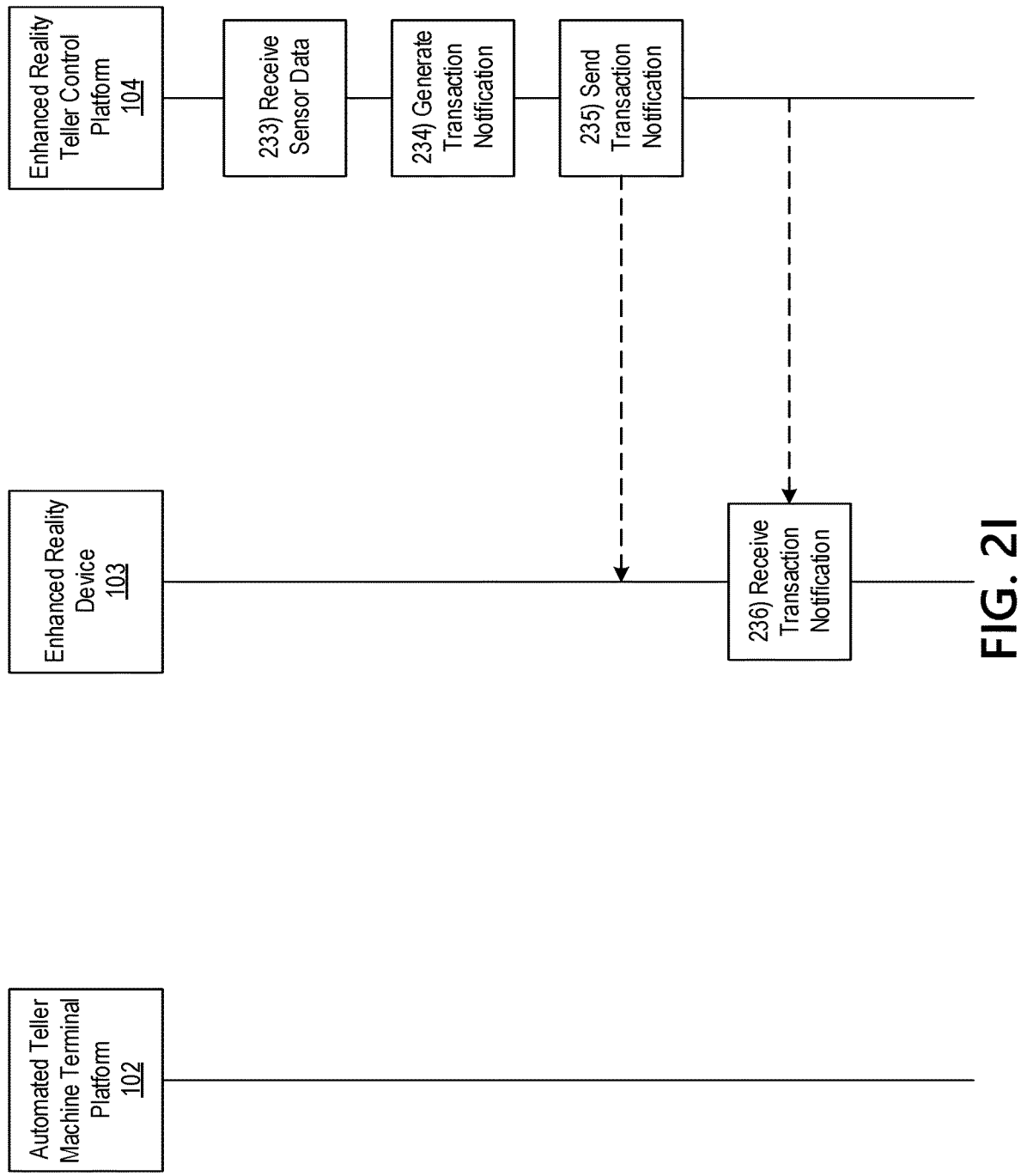

Referring to FIG. 2G, at step 225, enhanced reality teller control platform 104 may authenticate the enhanced reality device 103 using the authentication information sent at step 224. In some instances, the enhanced reality teller control platform 104 may validate the enhanced reality device 103 based on a comparison of the authentication information received against stored authentication information corresponding to the user's account. If the enhanced reality teller control platform 104 does not validate the enhanced reality device 103, the enhanced reality teller control platform 104 may return to step 221 and receive an additional authentication request. If the enhanced reality teller control platform 104 validates the enhanced reality device 103, the enhanced reality teller control platform 104 may proceed to step 226.

At step 226, the enhanced reality teller control platform 104 may send an authentication indication to the automated teller machine terminal platform 102 and the enhanced reality device 103. In some instances, the enhanced reality teller control platform 104 may send the authentication indication to the automated teller machine terminal platform 102 via the communication interface 113 and while the second wireless data connection is established. In some instances, the enhanced reality teller control platform 104 may send the authentication indication to the enhanced reality device 103 via the communication interface 113 and while the first wireless data connection is established. Additionally or alternatively, the enhanced reality teller control platform 104 may send one or more commands to the enhanced reality device 103 directing the enhanced reality device 103 to case display of the authentication indication.

Figures 3, 4:
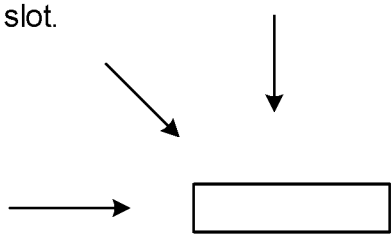
FIGS. 3-6 depict example graphical user interfaces for deploying a processing system that controls enhanced reality interfaces corresponding to a screen-less automated teller machine in accordance with one or more example embodiments.

At step 227, the enhanced reality device 103 may receive the authentication indication sent at step 226. In some instances, the enhanced reality device 103 may receive the authentication indication while the first wireless data connection is established. Additionally or alternatively, the enhanced reality device 103 may receive the one or more commands directing the enhanced reality device 103 to cause display of the authentication indication. In some instances, based on the one or more commands directing the enhanced reality device 103 to cause display of the authentication indication, the enhanced reality device 103 may cause display of a graphical user interface similar to graphical user interface 305, which is illustrated in FIG. 3. As seen in FIG. 3, graphical user interface 305 may indicate that the user has been authenticated. Additionally or alternatively, the graphical user interface 305 may indicate a particular screen-less automated teller machine that the user should use to continue the transaction. Additionally or alternatively, enhanced reality device 103 may determine the particular screen-less automated teller machine using a quick response (QR) code, radio-frequency identification (RFID), geolocation, and the like. In some instances, the user may proceed to the assigned screen-less automated teller machine displayed on the authentication interface.

At step 228, the automated teller machine terminal platform 102 may receive the authentication indication send at step 226. In some instances, the automated teller machine terminal platform 102 may receive the authentication indication while the second wireless data connection is established. Although steps 214-228 describe determining screen-less automated teller machine availability, it should be understood that these steps may also be performed to determine live teller availability at a branch office of a financial institution. In some instances, a customer may provide live tellers with transaction information before arriving at the branch office to finalize a transaction. Additionally or alternatively, this information may be used to estimate staffing needs at particular times throughout the day and to improve transaction processing efficiency.

Referring to FIG. 2H, at step 229, the enhanced reality teller control platform 104 may generate transaction interface information and one or more commands to generate a transaction interface. In some instances, in generating the transaction interface information, the enhanced reality teller control platform 104 may generate information that may be used to facilitate the transaction at the screen-less automated teller machine. Additionally or alternatively, the enhanced reality teller control platform 104 may generate information that may be used to generate an interface resembling an automated teller machine display screen.

At step 230, the enhanced reality teller control platform 104 may send the transaction interface information and the one or more commands to generate a transaction interface to the enhanced reality device. In some instances, the enhanced reality teller control platform 104 may send the transaction interface information and the one or more commands to generate a transaction interface via the communication interface 113 and while the first wireless data connection is established.

At step 231, the enhanced reality device 103 may receive the transaction interface information sent at step 230. In some instances, the enhanced reality device 103 may receive the transaction interface information while the first wireless data connection is established.

At step 232, the enhanced reality device 103 may cause display of a transaction interface based on the transaction interface information and the one or more commands to generate a transaction interface received at step 231. In some instances, in causing display of the transaction interface, the enhanced reality device 103 may cause display of a graphical user interface similar to graphical user interface 405, which is illustrated in FIG. 4. As seen in FIG. 4, graphical user interface 405 may provide assistance to a user by highlighting a particular feature of the screen-less automated teller machine such as an ATM card slot, a slot to dispense cash, and the like. In such instances, the transaction interface may correspond to guidance that may assist a user with performing a transaction. In addition, graphical user interface 405 may be displayed as an overlay on real-world elements using transparent and/or translucent display elements of the enhanced reality device 103. For instance, graphical user interface 405 may be displayed as an overlay on a headset-style augmented reality device (e.g., augmented reality glasses, virtual reality headsets, or the like), a mobile device, or any other type of enhanced reality device. In some instances, enhanced reality device 103 may display and/or otherwise present the graphical user interface 405 as an overlay on one or more real-world elements viewed by a user of the enhanced reality device 103 using one or more transparent and/or translucent display portions of the enhanced reality device 103.

Figures 5, 6:
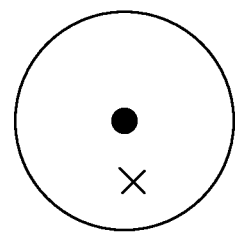

Additionally or alternatively, in causing display of the transaction interface, the enhanced reality device 103 may cause display of a graphical user interface similar to graphical user interface 505, which is illustrated in FIG. 5. As seen in FIG. 5, graphical user interface 505 may resemble an automated teller machine display. In such instances, the transaction interface may prompt a user to input information used to conduct the transaction such as a withdrawal amount. It should be understood that although FIG. 5 illustrates a withdrawal, other types of automated teller machine transactions may be conducted using the graphical user interface 505.

In some instances, in causing display of the transaction interface, the enhanced reality device 103 may provide a dynamic customized interface based on demographic information corresponding to the user (e.g., tailored to various age groups, geographic regions, or the like). In some instances, the customized interfaces may be pre-configured by the user or by a financial institution. Additionally or alternatively, in causing display of the transaction interface, the enhanced reality device 103 may cause display of one or more gamification user interfaces that may dynamically update based on the transaction (e.g., a cylinder that fills up with a different color based on current savings, a purchasable item that fills up with a different color as stored funds approach the purchase price, or the like).

Referring to FIG. 2I, at step 233, the enhanced reality teller control platform 104 may receive sensor data. In some instances, in receiving the sensor data, the enhanced reality teller control platform 104 may receive sensor data corresponding to a security perimeter of the screen-less automated teller machine. In some instances, the enhanced reality teller control platform 104 may receive sensor data from motion sensors, heat sensors, pressure sensors, cameras, and the like.

At step 234, the enhanced reality teller control platform 104 may generate a transaction notification based on the sensor data received at step 233. In some instances, the enhanced reality teller control platform 104 may also generate one or more commands directing the enhanced reality device 103 to cause display of the transaction notification. In generating the transaction notification, the enhanced reality teller control platform 104 may generate a security notification to warn the user of the presence of unauthorized personnel. In some instances, the enhanced reality teller control platform 104 may generate text notifications, video overlays, proximity indications, flashing indications, and the like.

At step 235, the enhanced reality teller control platform 104 may send the transaction notification and the one or more commands directing the enhanced reality device 103 to cause display of the transaction notification, generated at step 234, to the enhanced reality device 103. In some instances, the enhanced reality teller control platform 104 may send, while the first wireless data connection is established and via the communication interface 113, the transaction notification and the one or more commands directing the enhanced reality device 103 to cause display of the transaction notification.

At step 236, the enhanced reality device 103 may receive the transaction notification and the one or more commands directing the enhanced reality device 103 to cause display of the transaction notification sent at step 235. In some instances, the enhanced reality device 103 may receive the transaction notification and the one or more commands directing the enhanced reality device 103 to cause display of the transaction notification while the first wireless data connection is established.

Figure 2J:
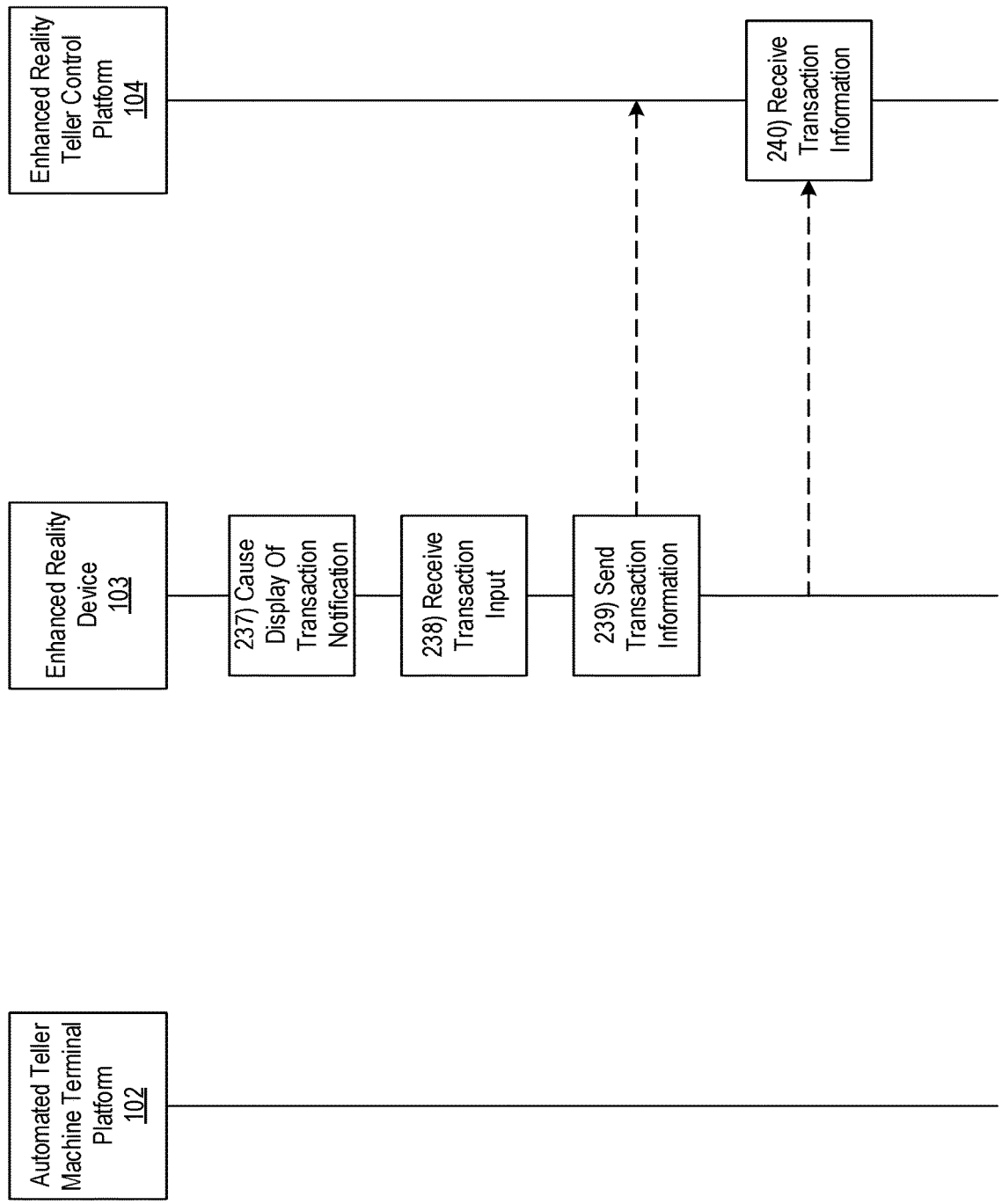

Referring to FIG. 2J, at step 237, the enhanced reality device 103 may cause display of the transaction notification. In some instances, in causing display of the transaction notification, the enhanced reality device 103 may cause display of a security notification via a display of the enhanced reality device 103. In some instances, the enhanced reality device 103 may cause display of a graphical user interface similar to graphical user interface 605, which is illustrated in FIG. 6. As seen in FIG. 6, graphical user interface 605 may indicate that unauthorized personnel has been detected behind the user (e.g., someone may be standing close to the user and may have an ability obtain confidential information and/or otherwise interfere with the transaction). In this instance, the graphical user interface 605 may indicate that money withdrawn by the user may be dispensed after a delay. In some instances, the delay may correspond to a period of time that the unauthorized personnel takes to vacate a predetermined security perimeter corresponding to the screen-less automated teller machine. In some instances, the graphical user interface 605 may include a map of the predetermined security perimeter and may cause display of locations of the user and the unauthorized personnel relative to each other. Although graphical user interface 605 illustrates a notification that cash will be dispensed after a delay, it should be understood that various security notifications may be displayed such as an indication not to insert a debit card, an indication not to enter a PIN number, and the like.

By causing display of the transaction notifications using the enhanced reality device 103, the enhanced reality device 103 may increase security corresponding to automated teller machine transactions. As such, rather than being housed in physical structures for increased security, the screen-less automated teller machines may be located out in the open. In some instances, the screen-less automated teller machines may be non-descript devices that may otherwise be unrecognizable as an automated teller machine, as described further above with regard to FIG. 1B. In these instances, multiple financial institutions may share the screen-less automated teller machines and branding corresponding to a particular financial institution corresponding to the user may be displayed through an enhanced reality interface. In instances where the screen-less automated teller machines are difficult to locate due to their non-descript nature, the enhanced reality device 103 may provide various options to locate and to navigate to the screen-less automated teller machine. Although receiving sensor data and generating transaction notifications are described above with regard to steps 233-237, it should be understood that such sensor data may be received and such transaction notifications may be generated at any point throughout the described event sequence At step 238, the enhanced reality device 103 may receive a transaction input. In receiving the transaction input, the enhanced reality device 103 may receive user input that may ordinarily be displayed on a display at an automated teller machine. In some instances, the enhanced reality device 103 may receive the transaction input by receiving a voice command, a touch input, a gesture input, and the like. In some instances, the transaction input may correspond to the information prompted for by the transaction interface at step 232 such as a withdrawal amount, a deposit amount, a transfer amount, and the like.

At step 239, the enhanced reality device 103 may send transaction information, based on the transaction input, to the enhanced reality teller control platform 104. In some instances, the enhanced reality device 103 may send the transaction information to the enhanced reality teller control platform 104 while the first wireless data connection is established.

At step 240, the enhanced reality teller control platform 104 may receive the transaction information sent at step 239. In some instances, the enhanced reality teller control platform 104 may receive the transaction information via the communication interface 113 and while the first wireless data connection is established.

Referring to FIG. 2K, at step 241, enhanced reality teller control platform 104 may send the transaction information, received at step 240, to the automated teller machine terminal platform 102. In some instances, the enhanced reality teller control platform 104 may send the transaction information via the communication interface 113 and while the second wireless data connection is established.

At step 242, the automated teller machine terminal platform 102 may receive the transaction information sent at step 241. In some instances, the automated teller machine terminal platform 102 may receive the transaction information while the second wireless data connection is established.

At step 243, the automated teller machine terminal platform 102 may perform the transaction based on the transaction information received at step 242. In some instances, in performing the transaction based on the transaction information, a screen-less automated teller machine of the automated teller machine terminal platform 102 may cause money to be deposited, withdrawn, transferred, or the like.

At step 244, the automated teller machine terminal platform 102 may send a transaction completion indication to the enhanced reality teller control platform 104. In sending the transaction completion indication, the automated teller machine terminal platform 102 may notify the enhanced reality teller control platform that the requested transaction has been performed. In some instances, the automated teller machine terminal platform 102 may send the transaction completion indication to the enhanced reality teller control platform 104 while the second wireless data connection is established.

Referring to FIG. 2L, at step 245 the enhanced reality teller control platform 104 may receive the transaction completion indication. In some instances, the enhanced reality teller control platform 104 may receive the transaction completion indication via the communication interface 113 and while the second wireless data connection is established.

At step 246, the enhanced reality teller control platform 104 may generate one or more commands directing the enhanced reality device 103 to indicate that the transaction has been completed using haptic feedback. In some instances, the one or more commands directing the enhanced reality device 103 to indicate that the transaction has been completed using haptic feedback may direct the enhanced reality device 103 to communicate with an additional device and to cause the additional device to provide the haptic feedback. In these instances, the additional device may be a wearable device such as a smart watch, fitness tracker, and the like.

At step 247, the enhanced reality teller control platform 104 may send the one or more commands directing the enhanced reality device 103 to indicate that the transaction has been completed using haptic feedback. In some instances, the enhanced reality teller control platform 104 may send the one or more commands directing the enhanced reality device 103 to indicate that the transaction has been completed using haptic feedback via the communication interface 113 and while the first wireless data connection is established.

At step 248, the enhanced reality device 103 may receive the one or more commands directing the enhanced reality device 103 to indicate that the transaction has been completed using haptic feedback and may provide a haptic feedback output. In some instances, the enhanced reality device 103 may receive the one or more commands directing the enhanced reality device 103 to indicate that the transaction has been completed using haptic feedback while the first wireless data connection is established. In some instances, in providing the haptic feedback output, the enhanced reality device 103 may vibrate to indicate that the transaction has been completed. Additionally or alternatively, the enhanced reality device 103 may cause a wearable device other than the enhanced reality device 103 to vibrate to indicate that the transaction has been completed. In some instances, in addition to indicating that the transaction has been completed, the haptic feedback may indicate that cash or an automated teller machine card is still in the screen-less automated teller machine and may be a reminder to the user to remove the cash before walking away from the screen-less automated teller machine. After receiving the haptic feedback output, the user may walk away from the screen-less automated teller machine.

Figure 2M:
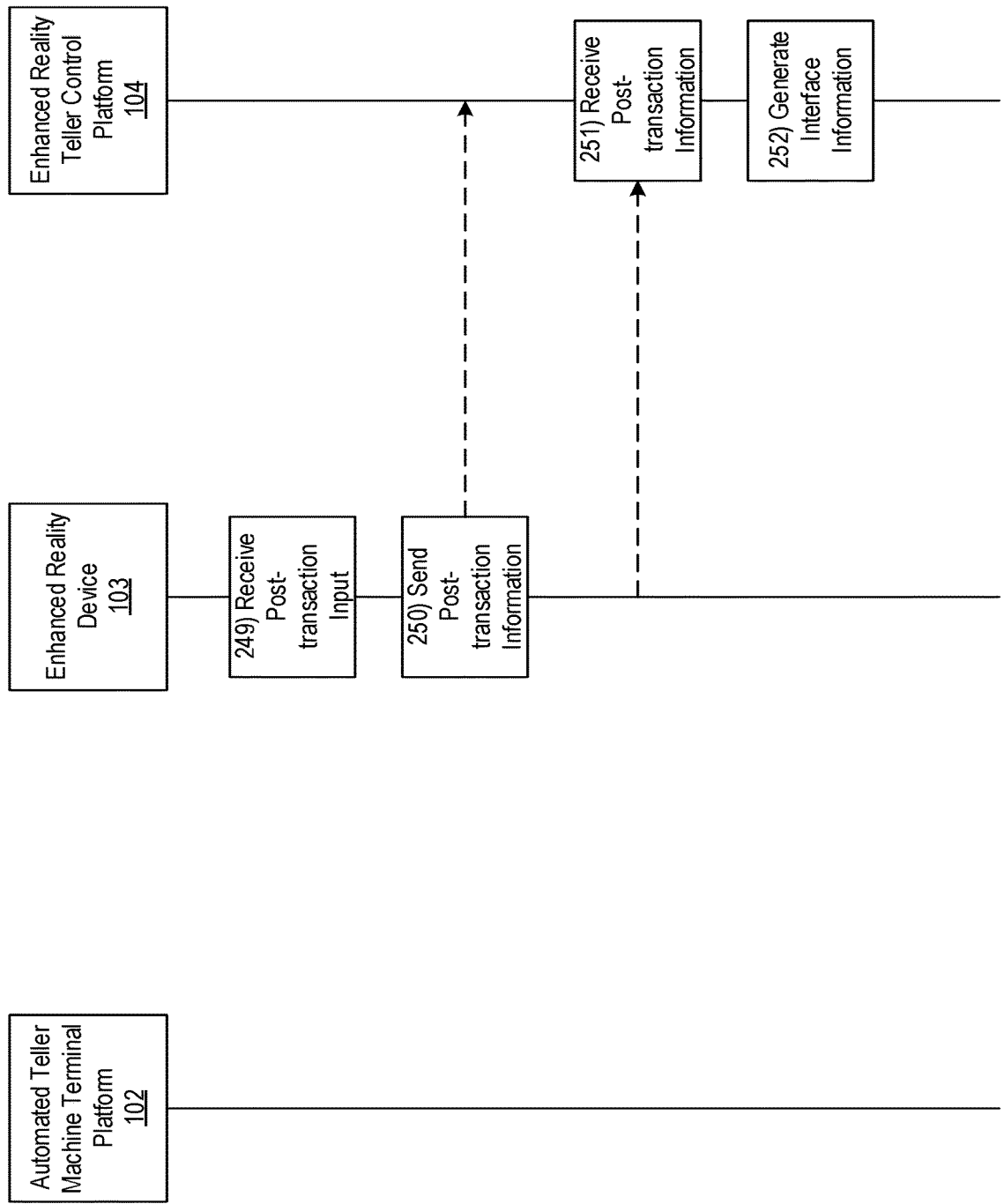

Referring to FIG. 2M, at step 249, the enhanced reality device 103 may receive a post-transaction input. In some instances, in receiving the post-transaction input, the enhanced reality device 103 may receive a user input indicating that the user wants to pursue additional transactions and/or other actions that may be performed away from the screen-less automated teller machine. In some instances, the post-transaction input may be an indication to conduct a transaction such as a money transfer between accounts. The enhanced reality device 103 may facilitate the money transfer although the user is no longer standing at the screen-less automated teller machine. This may reduce transaction times at the automated teller machine terminal platform 102 and may increase the efficiency of processing various requests. Additionally or alternatively, the post-transaction input may be an indication to pursue an advertisement presented by the enhanced reality device 103. In some instances, in presenting the advertisement, the enhanced reality device 103 may cause display of information corresponding to various accounts, credit cards, services, and the like providing by the financial institution, and the post-transaction input may correspond to an indication to learn more or to sign up for such additional services.

At step 250, the enhanced reality device 103 may send post-transaction information, based on the post-transaction input received at step 249, to the enhanced reality teller control platform 104. In some instances, the enhanced reality device 103 may send the post-transaction information to the enhanced reality teller control platform 104 while the first wireless data connection is established.

At step 251, the enhanced reality teller control platform 104 may receive the post-transaction information sent at step 250. In some instances, the enhanced reality teller control platform 104 may receive the post-transaction information via the communication interface 113 and while the first wireless data connection is established. At step 252, the enhanced reality teller control platform 104 may generate, based on the post-transaction information, post-transaction interface information and one or more commands directing the enhanced reality device 103 to cause display of a post-transaction interface.

Referring to FIG. 2N, at step 253, the enhanced reality teller control platform 104 may send the post-transaction interface information and one or more commands directing the enhanced reality device 103 to cause display of a post-transaction interface to the enhanced reality device 103. In some instances, the enhanced reality teller control platform 104 may send the post-transaction interface information and one or more commands directing the enhanced reality device 103 to cause display of a post-transaction interface to the enhanced reality device 103 while the first wireless data connection is established and via the communication interface 113.

At step 254, the enhanced reality device 103 may receive the post-transaction interface information and one or more commands directing the enhanced reality device 103 to cause display of the post-transaction interface. In some instances, the enhanced reality device 103 may receive the post-transaction interface information and one or more commands directing the enhanced reality device 103 to cause display of a post-transaction interface while the first wireless data connection is established.

At step 255, the enhanced reality device 103 may cause display of a post-transaction interface based on the post-transaction interface information and the one or more commands directing the enhanced reality device 103 to cause display of the post-transaction interface. As described above with regard to step 249, in causing display of the post-transaction interface, the enhanced reality device 103 may cause display of a user interface that allows a user to continue aspects of the transaction although the user is not physically located at the screen-less automated teller machine. Additionally or alternatively, in causing display of the post-transaction interface, the enhanced reality device 103 may cause display of a user interface that allows the user to explore additional services provided by a financial institution corresponding to the automated teller machine terminal platform 102. Additionally or alternatively, in causing display of the post-transaction interface, the enhanced reality device 103 may cause display of a user interface that allows the user to manage follow up issues and/or claims processing issues corresponding to the transaction. Additionally or alternatively, in causing display of the post-transaction interface, the enhanced reality device 103 may cause display of a user interface that corresponds to a receipt of the transaction.

Subsequently, the event sequence may end, and the enhanced reality teller control platform 104 may continue to facilitate transactions between various enhanced reality devices and various screen-less automated teller machines of the automated teller machine terminal platform 102. In providing a user interface for conducting transactions at an enhanced reality device 103, the enhanced reality teller control platform 104 eliminates the need for displays at automated teller machines. Additionally, by providing the user interfaces for conducting the transactions at the enhanced reality device 103, the enhanced reality teller control platform 104 allows users to pre-stage transactions prior to arriving at the automated teller machine terminal platform 102 and to continue aspects of the transactions after leaving the automated teller machine terminal platform 102 by causing display of various transaction interfaces at the enhanced reality device 103. Further, by providing the user interfaces for conducting the transactions at the enhanced reality device 103, the enhanced reality teller control platform 104 may increase transaction security by making user interfaces more private and by providing various security notifications. Thus, the enhanced reality teller control platform 104 may reduce cost corresponding to automated teller machines and may increase both efficiency and security of conducting transactions at such machines.

Figure 7:
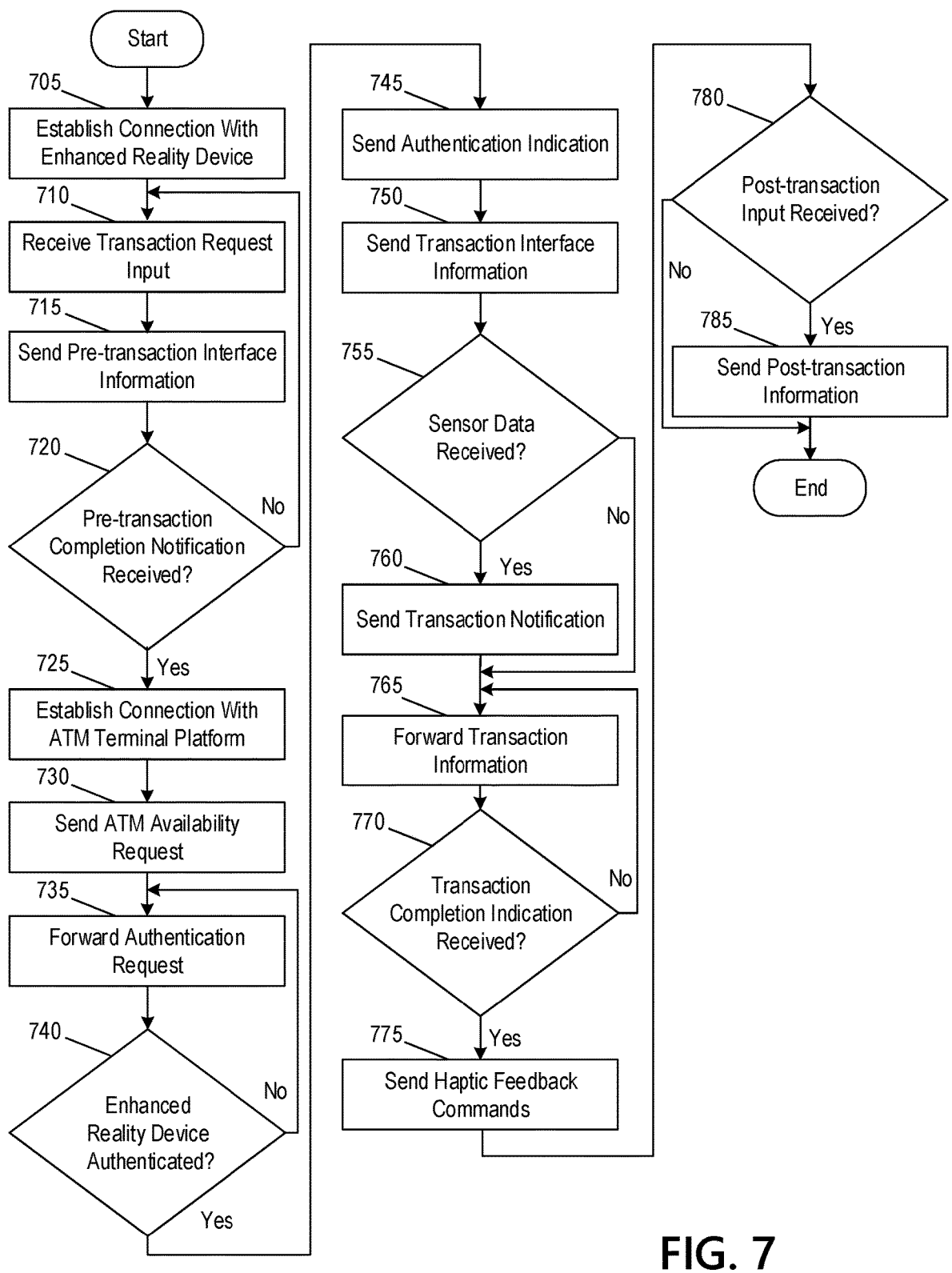
FIG. 7 depicts an illustrative method for deploying a processing system that controls enhanced reality interfaces corresponding to a screen-less automated teller machine in accordance with one or more example embodiments.

FIG. 7 depicts an illustrative method for deploying a processing system that controls enhanced reality interfaces corresponding to a screen-less automated teller machine in accordance with one or more example embodiments. Referring to FIG. 7, at step 705, a computing platform having at least one processor, a communication interface, and memory may establish a connection with an enhanced reality device. At step 710, the computing platform may receive a transaction request input indicating a transaction to be conducted with a screen-less automated teller machine. At step 715, the computing platform may generate pre-transaction interface information based on the transaction request input and may send the pre-transaction interface information to an enhanced reality device 103. At step 720, the computing platform may determine whether a pre-transaction completion notification was received. If a pre-transaction notification was not received, the computing platform may return to step 710. If a pre-transaction notification was received, the computing platform may proceed to step 725.

At step 725, the computing platform may establish a connection with an automated teller machine terminal platform. At step 730, the computing platform may send an automated teller machine availability request to the automated teller machine terminal platform to determine availability of screen-less automated teller machines of the automated teller machine terminal platform. At step 735, the computing platform may receive and subsequently forward an authentication request from an automated teller machine terminal platform and to an enhanced reality device respectively. At step 740, the computing platform may receive authentication information and may determine whether the enhanced reality device is authenticated based on the authentication information. If the computing platform determines that the enhanced reality device is not authenticated, the computing platform may return to step 735. If the computing platform determines that the enhanced reality device is authenticated, the computing platform may proceed to step 745.

At step 745, the computing platform may send an authentication indication to the automated teller machine terminal platform and the enhanced reality device. At step 750, the computing platform may generate and send transaction interface information that may be used by the enhanced reality device to cause display of a user interface for conducting the transaction. At step 755, the computing platform may determine whether sensor data was received. If sensor data has not been received, the computing platform may proceed to step 765. If sensor data has been received, the computing platform may proceed to step 760.

At step 760, the computing platform may send a transaction notification and one or more commands directing the enhanced reality device 103 to cause display of the transaction notification. At step 765, the computing platform may receive transaction information based on inputs to the transaction interface at the enhanced reality device, and may send the transaction information to an automated teller machine terminal platform. At step 770, the computing platform may determine whether a transaction completion indication was received. If a transaction completion indication was not received, the computing platform may return to step 765. If a transaction completion indication was received, the computing platform may proceed to step 775.

At step 775, the computing platform may generate and send one or more commands directing the enhanced reality device to cause output of a haptic feedback output indicating that the transaction has been completed. At step 780, the computing platform may determine whether a post-transaction input was received. If a post-transaction input was not received, the event sequence may end. If a post-transaction input was received, the event sequence may proceed to step 785. At step 785, the computing platform may send post-transaction information and one or more commands for the enhanced reality device to generate a post-transaction interface based on the post-transaction information to the enhanced reality device 103.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, from an enhanced reality device, a request to initiate a transaction with a screen-less automated teller machine of an automated teller machine terminal platform;
   send, to the enhanced reality device, pre-transaction interface information and one or more commands directing the enhanced reality device to generate a pre-transaction enhanced reality interface, wherein the pre-transaction enhanced reality interface prompts a user for information that is used to initiate the transaction with the screen-less automated teller machine;
   receive an authentication request from the screen-less automated teller machine indicating that the screen-less automated teller machine is available and requesting authentication information from the enhanced reality device;
   send, to the enhanced reality device and after validating the authentication information from the enhanced reality device, enhanced reality transaction interface information and one or more commands directing the enhanced reality device to generate an enhanced reality transaction interface corresponding to a display of the screen-less automated teller machine;
   receive a transaction completion indication from the screen-less automated teller machine indicating that the transaction with the screen-less automated teller machine is complete; and
   send, to the enhanced reality device and after receiving the transaction completion indication from the screen-less automated teller machine indicating that the transaction with the screen-less automated teller machine is complete, haptic feedback indicating that the transaction is complete.

2. The computing platform of claim 1, wherein the memory stores additional computer-readable instructions that, when executed by the at least one processor, further cause the computing platform to:
   establish, with the enhanced reality device, a first wireless data connection; and
   establish, with the automated teller machine terminal platform, a second wireless data connection.

3. The computing platform of claim 1, wherein the memory stores additional computer-readable instructions that, when executed by the at least one processor, further cause the computing platform to:
   receive the information that is used to initiate the transaction with the screen-less automated teller machine, wherein the information corresponds to a type of transaction to be performed and additional information corresponding to the transaction.

4. The computing platform of claim 1, wherein the memory stores additional computer-readable instructions that, when executed by the at least one processor, further cause the computing platform to:
   receive a pre-transaction completion indication from the enhanced reality device;
   generate, in response to receiving the pre-transaction completion indication, a screen-less automated teller machine availability request; and
   send, to the automated teller machine terminal platform, the screen-less automated teller machine availability request.

5. The computing platform of claim 4, wherein the memory stores additional computer-readable instructions that, when executed by the at least one processor, further cause the computing platform to:
   send, to the enhanced reality device, the authentication request;
   receive, in response to the authentication request, authentication information;
   validate the authentication information;
   generate, after validating the authentication information, an authentication indication; and
   send, to the screen-less automated teller machine and the enhanced reality device, the authentication indication.

6. The computing platform of claim 1, wherein the memory stores additional computer-readable instructions that, when executed by the at least one processor, further cause the computing platform to:

generate, based on the information that is used to initiate the transaction with the screen-less automated teller machine, the enhanced reality transaction interface information.

7. The computing platform of claim 1, wherein the memory stores additional computer-readable instructions that, when executed by the at least one processor, further cause the computing platform to:
receive sensor data from one or more sensors connected to the screen-less automated teller machine;
generate, based on the sensor data, a transaction notification and one or more commands directing the enhanced reality device to cause display of the transaction notification; and
send, to the enhanced reality device, the transaction notification and the one or more commands directing the enhanced reality device to cause display of the transaction notification.

8. The computing platform of claim 1, wherein the memory stores additional computer-readable instructions that, when executed by the at least one processor, further cause the computing platform to:
receive the transaction completion indication; and
generate, in response to receiving the transaction completion indication, one or more commands directing the enhanced reality device to provide a haptic feedback output indicating that the transaction is complete.

9. The computing platform of claim 1, wherein the memory stores additional computer-readable instructions that, when executed by the at least one processor, further cause the computing platform to:
receive post-transaction information;
generate, based on the post-transaction information, post-transaction interface information; and
send, to the enhanced reality device, the post-transaction interface information, wherein sending the post-transaction interface information causes the enhanced reality device to generate one or more post-transaction enhanced reality interfaces using the post-transaction interface information.

10. A method comprising:
at a computing platform comprising at least one processor, a communication interface, and memory:
receiving, from an enhanced reality device, a request to initiate a transaction with a screen-less automated teller machine of an automated teller machine terminal platform;
sending, to the enhanced reality device, pre-transaction interface information and one or more commands directing the enhanced reality device to generate a pre-transaction enhanced reality interface, wherein the pre-transaction enhanced reality interface prompts a user for information that is used to initiate the transaction with the screen-less automated teller machine;
receiving an authentication request from the screen-less automated teller machine indicating that the screen-less automated teller machine is available and requesting authentication information from the enhanced reality device;
sending, to the enhanced reality device and after validating the authentication information from the enhanced reality device, enhanced reality transaction interface information and one or more commands directing the enhanced reality device to generate an enhanced reality transaction interface corresponding to a display of the screen-less automated teller machine;
receiving a transaction completion indication from the screen-less automated teller machine indicating that the transaction with the screen-less automated teller machine is complete; and
sending, to the enhanced reality device and after receiving the transaction completion indication from the screen-less automated teller machine indicating that the transaction with the screen-less automated teller machine is complete, haptic feedback indicating that the transaction is complete.

11. The method of claim 10, further comprising:
establishing, with the enhanced reality device, a first wireless data connection; and
establishing, with the automated teller machine terminal platform, a second wireless data connection.

12. The method of claim 10, further comprising:
receiving the information that is used to initiate the transaction with the screen-less automated teller machine, wherein the information corresponds to a type of transaction to be performed and additional information corresponding to the transaction.

13. The method of claim 10, further comprising:
receiving a pre-transaction completion indication from the enhanced reality device;
generating, in response to receiving the pre-transaction completion indication, a screen-less automated teller machine availability request; and
sending, to the automated teller machine terminal platform, the screen-less automated teller machine availability request.

14. The method of claim 13, further comprising:
sending, to the enhanced reality device, the authentication request;
receiving, in response to the authentication request, authentication information;
validating the authentication information;
generating, after validating the authentication information, an authentication indication; and
sending, to the screen-less automated teller machine and the enhanced reality device, the authentication indication.

15. The method of claim 10, further comprising:
generating, based on the information that is used to initiate the transaction with the screen-less automated teller machine, the enhanced reality transaction interface information.

16. The method of claim 10, further comprising:
receiving sensor data from one or more sensors connected to the screen-less automated teller machine;
generating, based on the sensor data, a transaction notification and one or more commands directing the enhanced reality device to cause display of the transaction notification; and
sending, to the enhanced reality device, the transaction notification and the one or more commands directing the enhanced reality device to cause display of the transaction notification.

17. The method of claim 10, further comprising:
receiving the transaction completion indication; and
generating, in response to receiving the transaction completion indication, one or more commands directing the enhanced reality device to provide a haptic feedback output indicating that the transaction is complete.

18. The method of claim 10, further comprising:
  receiving post-transaction information;
  generating, based on the post-transaction information, post-transaction interface information; and
  sending, to the enhanced reality device, the post-transaction interface information, wherein sending the post-transaction interface information causes the enhanced reality device to generate one or more post-transaction enhanced reality interfaces using the post-transaction interface information.

19. One or more non-transitory computer-readable media storing instructions that, when executed by a computing platform comprising at least one processor, a communication interface, and memory, cause the computing platform to:
  receive, from an enhanced reality device, a request to initiate a transaction with a screen-less automated teller machine of an automated teller machine terminal platform;
  send, to the enhanced reality device, pre-transaction interface information and one or more commands directing the enhanced reality device to generate a pre-transaction enhanced reality interface, wherein the pre-transaction enhanced reality interface prompts a user for information that is used to initiate the transaction with the screen-less automated teller machine;
  receive an authentication request from the screen-less automated teller machine indicating that the screen-less automated teller machine is available and requesting authentication information from the enhanced reality device;
  send, to the enhanced reality device and after validating the authentication information from the enhanced reality device, enhanced reality transaction interface information and one or more commands directing the enhanced reality device to generate an enhanced reality transaction interface corresponding to a display of the screen-less automated teller machine;
  receive a transaction completion indication from the screen-less automated teller machine indicating that the transaction with the screen-less automated teller machine is complete; and
  send, to the enhanced reality device and after receiving the transaction completion indication from the screen-less automated teller machine indicating that the transaction with the screen-less automated teller machine is complete, haptic feedback indicating that the transaction is complete.

20. The one or more non-transitory computer-readable media of claim 19, wherein the memory stores additional computer-readable instructions that, when executed by the at least one processor, further cause the computing platform to:
  receive sensor data from one or more sensors connected to the screen-less automated teller machine;
  generate, based on the sensor data, a transaction notification and one or more commands directing the enhanced reality device to cause display of the transaction notification; and
  send, to the enhanced reality device, the transaction notification and the one or more commands directing the enhanced reality device to cause display of the transaction notification.

* * * * *